United States Patent
Kwak et al.

(10) Patent No.: US 11,678,154 B2
(45) Date of Patent: Jun. 13, 2023

(54) V2X OPERATING METHOD BASED ON TTI BUNDLING IN WIRELESS COMMUNICATION SYSTEM AND TERMINAL USING SAME

(71) Applicant: LG ELECTRONICS INC., Seoul (KR)

(72) Inventors: Kyuhwan Kwak, Seoul (KR); Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 17/264,600

(22) PCT Filed: Jul. 24, 2019

(86) PCT No.: PCT/KR2019/009154
§ 371 (c)(1),
(2) Date: Jan. 29, 2021

(87) PCT Pub. No.: WO2020/027484
PCT Pub. Date: Feb. 6, 2020

(65) Prior Publication Data
US 2021/0297829 A1    Sep. 23, 2021

(30) Foreign Application Priority Data

Jul. 30, 2018  (KR) .................... 10-2018-0088804

(51) Int. Cl.
*H04W 56/00* (2009.01)
*H04W 4/40* (2018.01)
(Continued)

(52) U.S. Cl.
CPC ............. *H04W 4/40* (2018.02); *H04W 72/02* (2013.01); *H04W 72/0446* (2013.01); *H04W 72/1263* (2013.01)

(58) Field of Classification Search
CPC ... H04W 4/40; H04W 72/02; H04W 72/0446; H04W 72/1263
(Continued)

(56) References Cited

U.S. PATENT DOCUMENTS

2015/0049740 A1    2/2015  Lee et al.
2018/0092122 A1*   3/2018  Babaei ................ H04W 72/042
(Continued)

FOREIGN PATENT DOCUMENTS

KR    20160037037    4/2016
WO    2018084524     5/2018

OTHER PUBLICATIONS

PCT International Application No. PCT/KR2019/009154, International Search Report dated Oct. 30, 2019, 4 pages.
(Continued)

*Primary Examiner* — Sai Ming Chan
(74) *Attorney, Agent, or Firm* — Lee Hong Degerman Kang Waimey

(57) ABSTRACT

The present invention relates to a method, performed by a terminal supporting bundling of a plurality of transmission time intervals (TTIs), for transmitting vehicle-to-X (V2X) data in a wireless communication system, the method comprising: transmitting scheduling information related to transmission of the V2X data; and transmitting the V2X data through bundling of the plurality of the TTIs, wherein, when there is a change in the plurality of bundled TTIs, the terminal transmits the scheduling information which further includes information related to the change.

10 Claims, 31 Drawing Sheets

(51) Int. Cl.
　　　*H04W 72/02*　　　(2009.01)
　　　*H04W 72/0446*　　(2023.01)
　　　*H04W 72/1263*　　(2023.01)
(58) Field of Classification Search
　　　USPC ........................................................ 370/329
　　　See application file for complete search history.

(56) References Cited

U.S. PATENT DOCUMENTS

| | | | | |
|---|---|---|---|---|
| 2018/0343652 | A1* | 11/2018 | Baghel | H04W 74/0808 |
| 2020/0029327 | A1* | 1/2020 | Bharadwaj | H04W 72/042 |
| 2020/0045516 | A1* | 2/2020 | Lee | H04L 5/0048 |
| 2020/0367147 | A1* | 11/2020 | Höglund | H04W 48/02 |
| 2021/0235477 | A1* | 7/2021 | Baldemair | H04W 72/1284 |
| 2021/0258887 | A1* | 8/2021 | Osawa | H04W 52/242 |

OTHER PUBLICATIONS

Huawei et al., "V2X sidelink channel model," 3GPP TSG RAN WG1 Meeting #93, R1-1805914, May 2018, 31 pages.
Samsung, "Support of shorter latency in V2X," 3GPP TSG RAN WG1 Meeting #93, R1-1806681, May 2018, 4 pages.

* cited by examiner

V2X OPERATING METHOD BASED ON TTI BUNDLING IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2019/009154, filed on Jul. 24, 2019, which claims the benefit of earlier filing date and right of priority to KR Application No. 10-2018-0088804, filed on Jul. 30, 2018, the contents of which is hereby incorporated by reference herein in its entirety.

BACKGROUND OF THE DISCLOSURE

Field of the Disclosure

The present disclosure relates to wireless communication, and more particularly, to a V2X operation method based on TTI (transmission time interval) bundling in a wireless communication system and a terminal using the method.

Related Art

Recently, in 3GPP standardization organization, it has been considered a network slicing technique for implementing a plurality of logical networks on a single physical network in the NR system, which is 5G wireless communication system. To this end, the logical networks needs to be capable of supporting services having various requirements (e.g., enhanced Mobile Broadband (eMBB), massive Machine Type Communication (mMTC), Ultra Reliable Low Latency Communication (URLLC), etc.). In addition, in the physical layer system of the NR system, it has been considered a technique for supporting an orthogonal frequency division multiplexing (OFDM) scheme in which a variable numerology is applicable according to the various services. In other words, in the NR (New RAT) system, an OFDM scheme (or a multiple access scheme) in which independent numerologies are applied in each time and frequency resource region may be supported.

Meanwhile, as a method for increasing reliability of a message transmitted by a terminal, a method of bundling and transmitting a plurality of TTIs by accumulating energy in a time axis may be considered.

When applying a TTI bundling operation, a transmission environment may change within a period for transmitting a TTI bundling unit. In a case where the terminal performs V2X operation without considering the change of the transmission environment in a situation where a plurality of TTIs are bundled, and when the change occurs without prior notice, an error may occur when the terminal performs channel estimation and/or data decoding.

Thus, in accordance with the present disclosure, in order to solve the above problem, a method in which when the change in the bundled TTIs occurs when the terminal performs the V2X operation based on the TTI bundling, information on changed contents are transmitted is provided. Further, a device using the method is provided.

SUMMARY

The present disclosure provides a V2X operation method based on TTI (transmission time interval) bundling in a wireless communication system and a terminal using the method.

In an aspect, a method for transmitting V2X (vehicle-to-everything) data in a wireless communication system is provided. The method is performed by a terminal supporting bundling of a plurality of transmission time intervals (TTI) and comprises transmitting scheduling information related to transmission of the V2X data, and transmitting the V2X data via bundling of the plurality of TTIs, wherein when a change in the plurality of bundled TTIs occurs, the terminal includes information related to the change into the scheduling information and then transmits the scheduling information.

The terminal may repeatedly transmit the V2X data in each of the plurality of TTIs.

The terminal may transmit the scheduling information each time in each of the plurality of TTIs or per a predefined TTI length unit within the plurality of TTIs.

The change-related information may be power-related information, when a change in power in the plurality of TTIs occurs, the terminal may include the power-related information into the scheduling information and then transmits the scheduling information.

The power-related information may include information about a period for which the power is constantly maintained within the plurality of bundled TTIs.

The power-related information may include information about a period for which the power changes within the plurality of bundled TTIs.

The terminal may support simultaneous transmission on a first carrier and a second carrier, when the terminal performs a transmission operation on the second carrier while performing a transmission operation on the first carrier, the terminal determines that the change in the power in the plurality of TTIs occurs.

The information related to the change may be feedback notification information, when feedback transmission occurs in the plurality of TTIs, the terminal includes the feedback notification information into the scheduling information and then transmits the scheduling information.

The feedback notification information may include information about an index of a TTI to which feedback is mapped among the plurality of TTIs.

The feedback notification information may include information indicating that feedback is transmitted in a corresponding TTI.

In another aspect, a terminal for supporting bundling of a plurality of transmission time intervals (TTI) in a wireless communication system is provided. The terminal comprises a transceiver for transmitting and receiving a radio signal and a processor configured to control the transceiver, the processor is configured to: control the transceiver to transmit scheduling information related to the transmission of the V2X data and control the transceiver to transmit the V2X data via bundling of the plurality of TTIs, when a change in the plurality of bundled TTIs occurs, the processor is configured to include information related to the change into the scheduling information, and to control the transceiver to transmit the scheduling information.

In other aspects, a method for transmitting information related to vehicle-to-X (V2X) data transmission in a wireless communication system is provided. The method is performed by a base station supporting bundling of a plurality of transmission timer periods (TTI) and comprises transmitting information related to the V2X data transmission to a terminal, the information related to the V2X data transmission is related to transmission of scheduling information.

According to the present disclosure, the transmitting terminal may notify the receiving terminal of whether the power change in the TTI bundling unit occurs such that the transmitting terminal may adjust the power more adaptively. Further, the transmitting terminal may notify the receiving terminal of a period for which RS bundling may be performed, thereby improving channel estimation performance or preventing a channel estimation error due to power adjustment. Further, when the power is changed more frequently within the bundled TTI, a power transient period occurs frequently, which may affect data and/or feedback information and/or transmission performance of SA. However, the frequency of power transients may be adjusted according to the transmission situation (or capability) of the terminal.

DESCRIPTION OF EXEMPLARY EMBODIMENTS

Hereinafter, terms or abbreviations that are not separately defined may be defined in 3GPP TS 36 series or TS 38 series.

Figure 1:
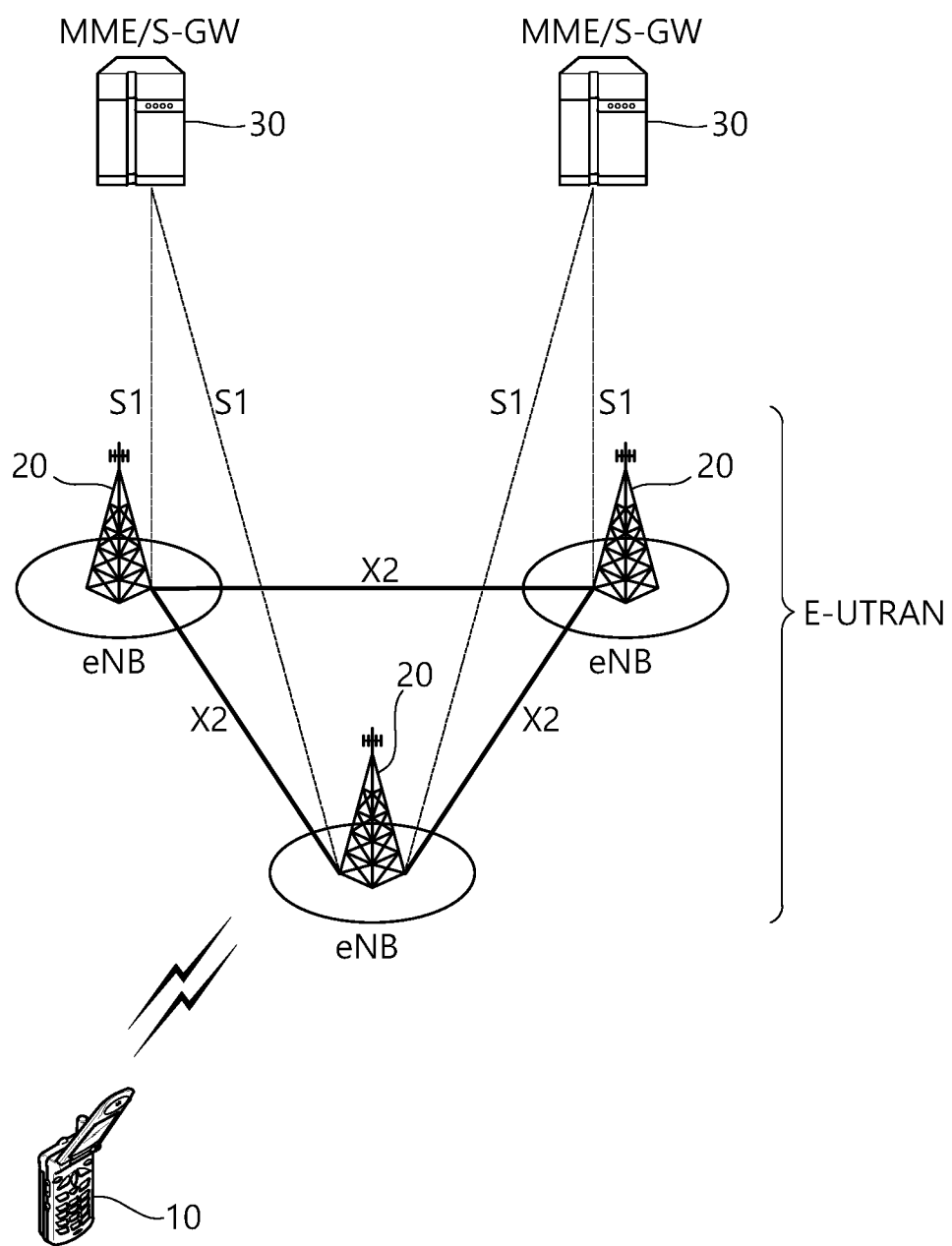
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
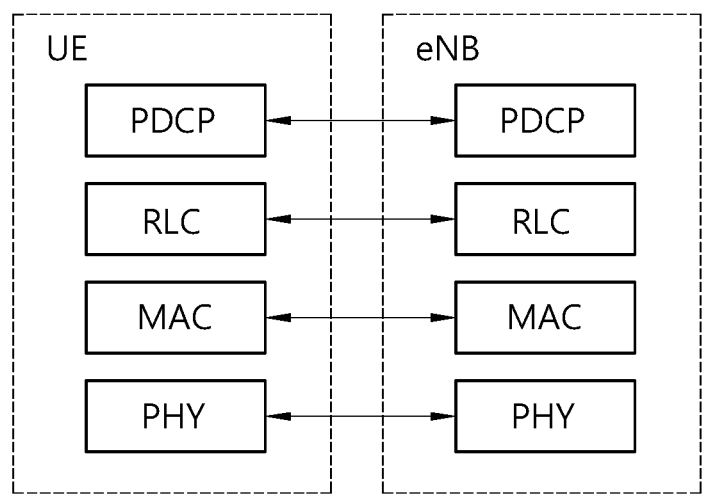
FIG. 2 is a diagram showing a wireless protocol architecture for a user plane.
Figure 3:
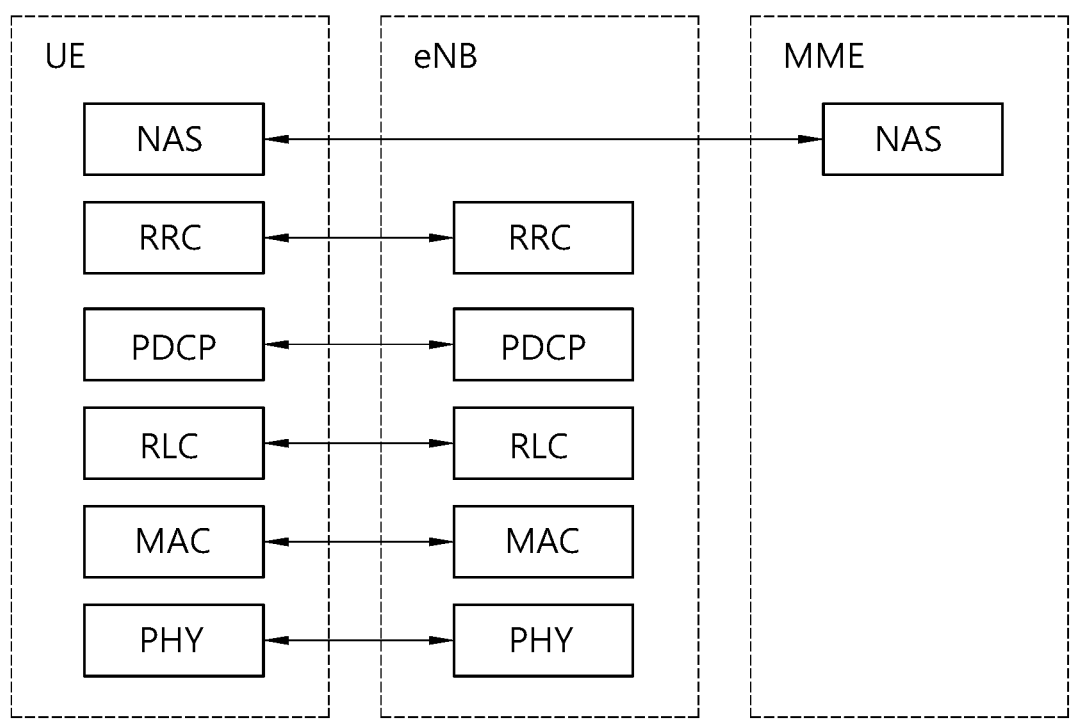
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
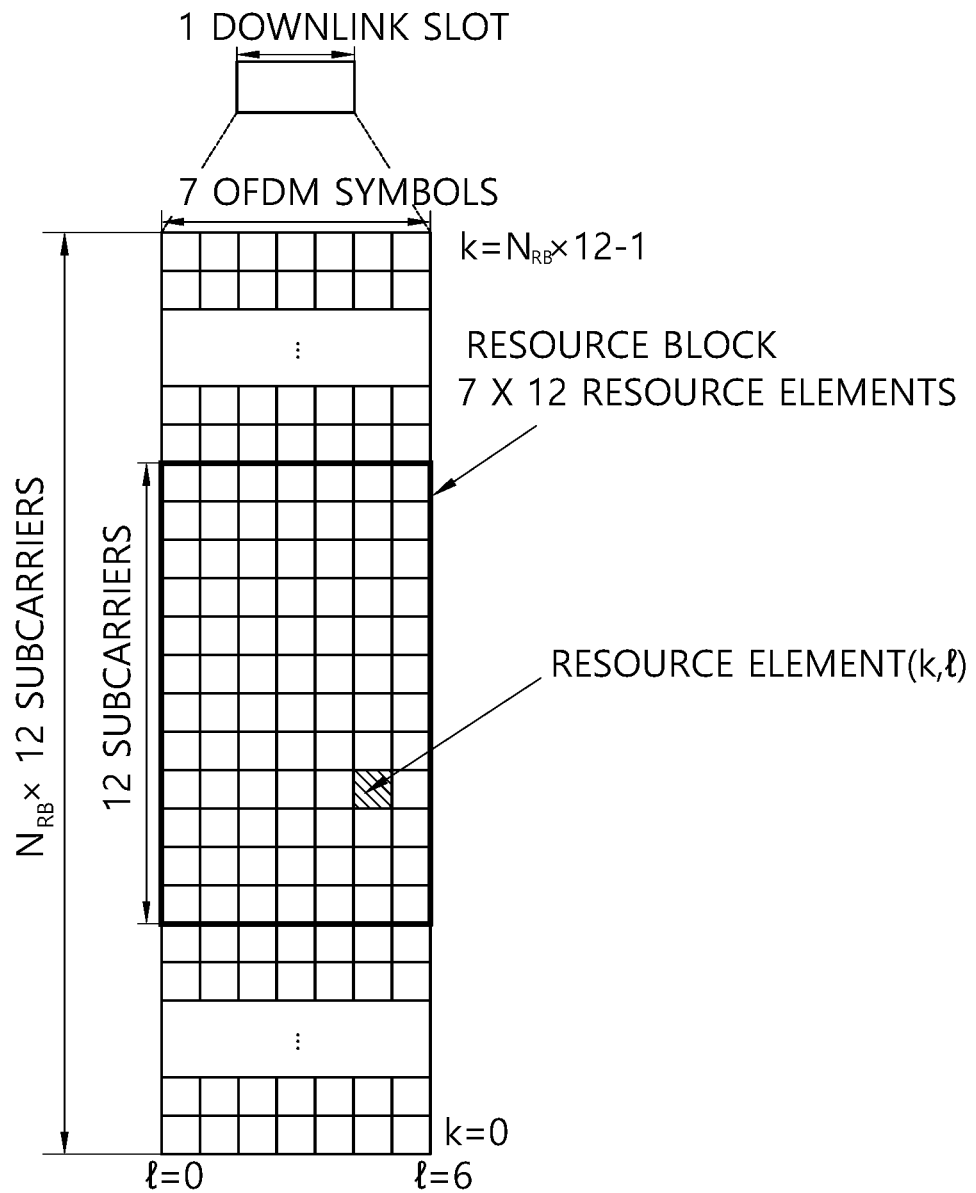
FIG. 4 shows an example of a downlink/uplink (DL/UL) slot structure in a wireless communication system.

FIG. 4 shows an example of a downlink/uplink (DL/UL) slot structure in a wireless communication system. In particular, FIG. 4 shows a structure of a resource grid of a 3GPP LTE (-A) system. There is one resource grid per antenna port.

A slot includes a plurality of orthogonal frequency division multiplexing (OFDM) symbols in a time domain and includes a plurality of resource blocks (RBs) in a frequency domain. The OFDM symbol also refers to one symbol interval. Referring to FIG. 4, a signal transmitted in each slot may be represented by a resource grid including $N^{DL/UL}_{RB} * N^{RB}_{sc}$ subcarriers and $N^{DL/UL}_{symb}$ OFDM symbols. Here, $N^{DL}_{RB}$ denotes the number of resource blocks (RBs) in a downlink slot, and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in the downlink slot, and $N^{UL}_{symb}$ denotes the number of OFDM symbols in the UL slot. $N^{RB}_{sc}$ denotes the number of subcarriers constituting one RB.

An OFDM symbol may be called an SC-FDM (Single Carrier Frequency Division Multiplexing) symbol according to a multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 4 illustrates a subframe in which a slot includes 7 OFDM symbols for convenience, embodiments of the present disclosure may be equally applied to subframes having different numbers of OFDM symbols. Referring to FIG. 4, each OFDM symbol includes $N^{DL/UL}_{RB} * N^{RB}_{sc}$ subcarriers in the frequency domain. Subcarrier types may be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency ($f_o$) during OFDM signal generation or frequency up-conversion. The carrier frequency is also called a center frequency.

One RB is defined by $N^{DL}_{symb}$ (e.g., 7) consecutive OFDM symbols in the time domain and $N^{RB}_{sc}$ (e.g. 12) consecutive subcarriers in the frequency domain. For reference, a resource composed of an OFDM symbol and a subcarrier is called a resource element (RE) or a tone. Accordingly, an RB is composed of $N^{DL/DL}_{symb} * N^{RB}_{sc}$. Each RE in the resource grid may be uniquely defined by an index pair (k,l) in a slot. Here, k is an index in the range of 0 to $N^{DL/UL}_{RB} * N^{RB}_{sc} - 1$ in the frequency domain and l is an index in the range of 0 to $N^{DL/UL}_{symb} - 1$.

Two RBs that occupy $N^{RB}_{sc}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N^{DL}_{VRB} - 1$, and $N^{DL}_{VRB} = N^{DL}_{RB}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as an VRB pair.

Figure 5:
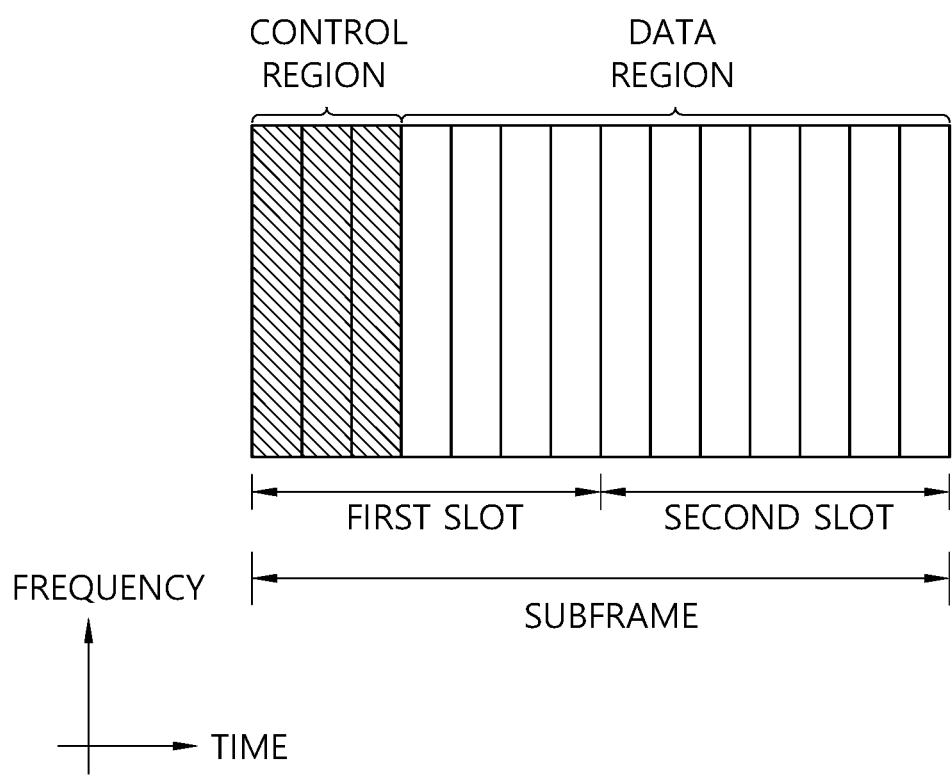
FIG. 5 illustrates a downlink (DL) subframe structure used in the 3GPP LTE/LTE(-A) system.

FIG. 5 illustrates a downlink (DL) subframe structure used in the 3GPP LTE/LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ ACK/NACK as a response to UL transmission.

Control information transmitted via a PDCCH is referred to as downlink control information (DCI). The DCI includes resource allocation information for a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a transmission (Tx) power control command set for individual UEs in a UE group, a Tx power control command, activation indication information of voice over IP (VoIP), etc. The size and usage of the DCI carried by one PDCCH may be changed according to DCI format and the size of the DCI may be changed according to a coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked (or scrambled) with an identifier (e.g. a radio network temporary identifier (RNTI)) according to an owner or usage of the PDCCH. If the PDCCH is for a specific UE, a cell-RNTI (C-RNTI) of the UE may be masked to the CRC. If the PDCCH is for a paging message, a paging identifier (e.g. paging-RNTI (P-RNTI)) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (i.e. a PCFICH and a PHICH). A DCI format and the number of DCI bits are determined according to the number of CCEs.

CCEs are numbered and consecutively used. In order to simplify a decoding process, a PDCCH having a format composed of n CCEs may start from only a CCE having a number corresponding to a multiple of n. The number of CCEs used to transmit a specific PDCCH, that is, a CCE aggregation level, is determined by a BS according to channel state. For example, in case of a PDCCH for a UE having a good DL channel (e.g. a UE adjacent to a BS), one CCE may be sufficient. However, in case of a PDCCH for a UE having a bad channel (e.g. a UE located at a cell edge), 8 CCEs may be required to obtain sufficient robustness.

Figure 6:
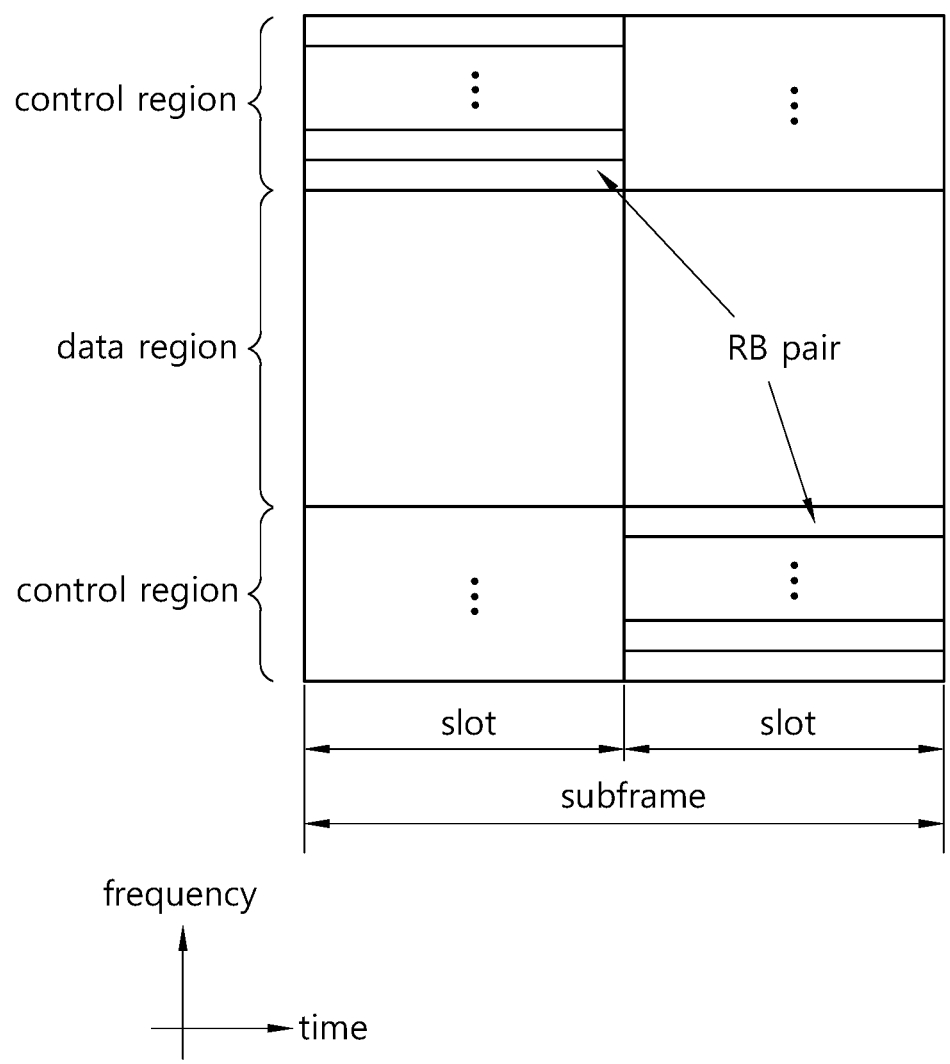
FIG. 6 illustrates a structure of an uplink subframe used in the 3GPP LTE/LTE(-A) system.

FIG. 6 illustrates a structure of an uplink subframe used in the 3GPP LTE/LTE(-A) system.

Referring to FIG. 6, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency $f_0$ during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 7:
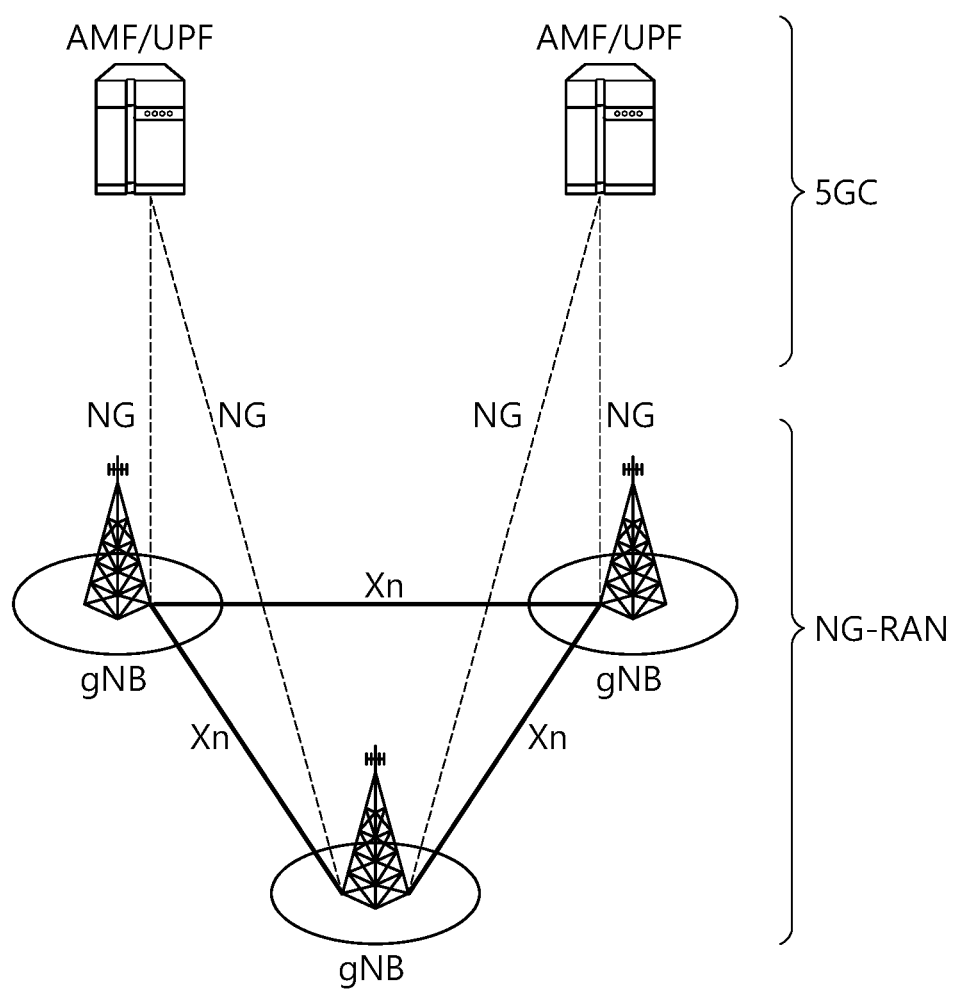
FIG. 7 illustrates a system structure of a new generation radio access network (NG-RAN) to which NR is applied.

FIG. 7 illustrates a system structure of a new generation radio access network (NG-RAN) to which NR is applied.

Referring to FIG. 7, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 8:
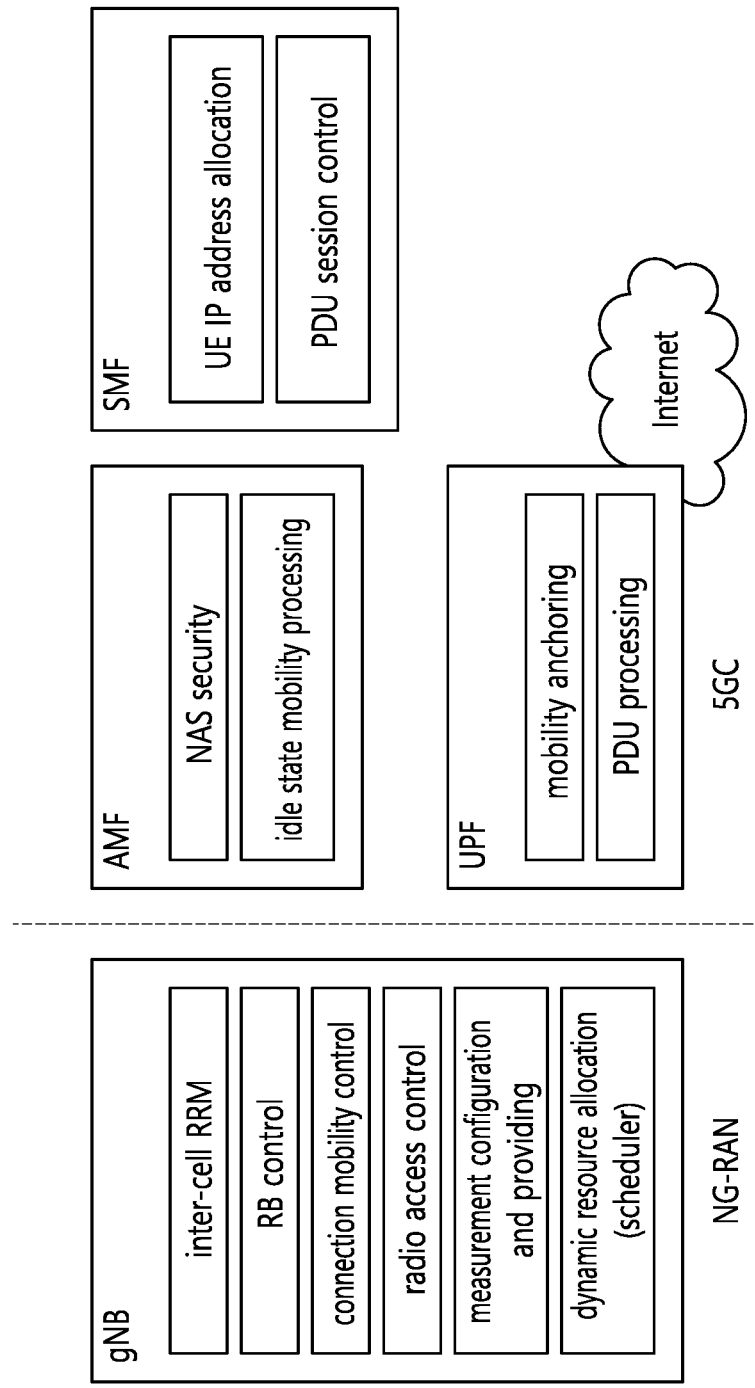
FIG. 8 illustrates functional partitioning between NG-RAN and 5GC.

FIG. 8 illustrates functional partitioning between NG-RAN and 5GC.

Referring to FIG. 8, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<D2D (Device-to-Device) Operation>

Hereinafter, it is described the components for device-to-device communication (D2D) technique.

Figure 9:
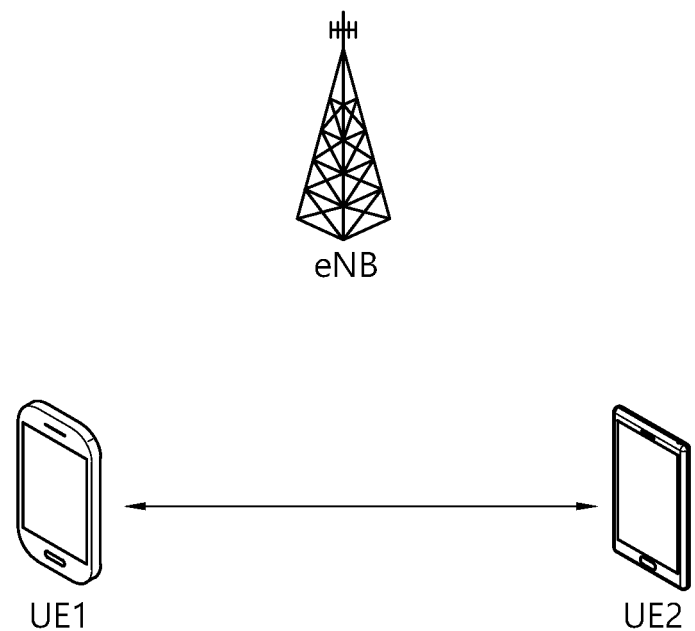
FIG. 9 illustrates a system architecture to which a D2D operation is applied.

FIG. 9 illustrates a system architecture to which a D2D operation is applied.

In FIG. 9, a UE means a user UE, but in the case that a network equipment like an eNB transmits and receives a signal according to a communication scheme between UEs, the network equipment like an eNB may also be regarded as a kind of UE.

Hereinafter, UE1 may be operated to select a resource unit corresponding to a specific resource in a resource pool that means a set of a series of resources and transmit a D2D signal by using the corresponding resource unit.

UE2, which is a reception UE for the transmission, may be configured with a resource pool in which UE1 may transmit a signal and may detect the signal of UE1.

Here, the resource pool may be informed by an eNB in the case that UE1 is within a connection coverage of the eNB, and may be informed by another UE or determined as a predetermined resource in the case that UE 1 is out of a connection coverage of the eNB.

Generally, a resource pool includes multiple resource units, and each UE may select one or multiple resource units and use the one or multiple resource units in its own D2D signal transmission.

Figure 10:
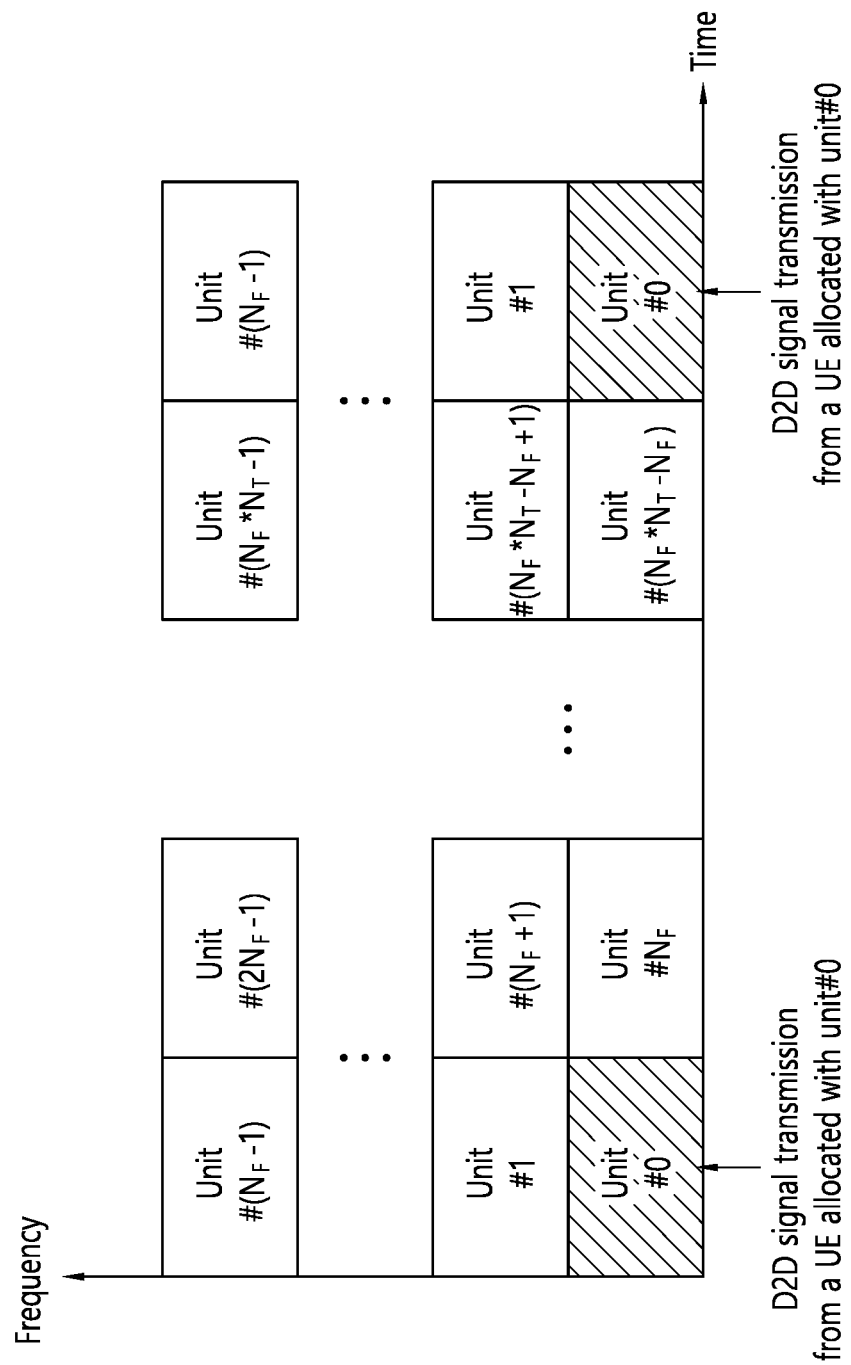
FIG. 10 illustrates an example of a resource unit on time and frequency resource.

FIG. 10 illustrates an example of a resource unit on time and frequency resource.

The example of FIG. 10 corresponds to the case that the entire frequency resource resources are divided by NF, and the entire time resources are divided by NT, and accordingly total NF*NT resource units are defined.

In the example of FIG. 10, the resource pool is repeated in a period of NT subframe. Distinctively, a single resource unit may be present repeatedly as shown in FIG. 10. Alternatively, in order to obtain diversity effect in a time or frequency domain, an index of a physical resource unit which is mapped to a single logical resource unit may be changed in a predetermined pattern depending on a time.

In such a resource unit architecture, a resource pool may mean a set of resource units that a UE intended to transmit a D2D signal uses in a transmission.

The resource pool described above may be sub divided into several types. First, the resource pool may be distinguished according to a content of a D2D signal which is transmitted in each resource pool.

As an example, the contents of the following D2D signal may be distinguished, and a separate resource pool may be configured for each of them.

Scheduling Assignment (SA) or D2D (Sidelink) Control Channel:

A signal including information such as a position of resource of a D2D data channel transmitted in a subsequent or a same subframe (SF) by each transmission UE, MCS (modulation and coding scheme) or MIMO (Multiple Input Multiple Output) transmission scheme required to demodulate other data channel, and a timing advance.

This signal may be transmitted with being multiplexed with D2D data on the same resource unit, and in this case, a SA resource pool may mean a pool of resources in which SA and D2D data are multiplexed and transmitted. This may also be called the other name, D2D (sidelink) control channel.

D2D Data Channel:

A pool of resources that a transmission UE uses for transmitting user data by using a resource designated by SA.

In the case that it is available to be multiplexed with D2D data and transmitted on the same resource unit, in the resource pool for D2D data channel, only the D2D data channel excluding SA information is transmitted.

In other words, the resource element which was used for transmitting the SA information in an individual resource unit in a SA resource pool is still used for transmitting D2D data in the D2D data channel resource pool.

Discovery Channel:

A resource pool for a message in which information such as an ID of a transmission UE is transmitted and enables for an adjacent UE to discover the transmission UE.

Even in the case that a content of D2D signal described above is the same, depending on a transmission and reception attribute of D2D signal, different resource pool may be used.

As an example, even in the case of the same D2D data channel or a discovery message, depending on a transmission timing determination scheme of a D2D signal (e.g., whether it is transmitted on a reception timing of synchronization reference signal or transmitted by applying a predetermined timing advance), a resource allocation scheme (e.g., whether a transport resource of an individual signal is designated by an eNB to an individual transmission UE or an individual transmission UE selects an individual signal transport resource autonomously in a pool), a signal format (e.g., the number of symbols occupied by each D2D signal in a subframe or the number of subframes used for transmitting a single D2D signal), a signal strength from an eNB or a transmission power strength of a D2D UE, it may be further distinguished as different resource pool.

For the convenience of description, in a D2D communication, a method that an eNB directly indicates a transport resource of a D2D transmission UE is called Mode 1, and a transport resource region is preconfigured or a method that an eNB designates a transport resource region and a UE directly selects a transport resource is called Mode 2.

For a D2D discovery, a case that an eNB directly indicates a resource is called Type 2, and a case that a UE directly selects a transport resource in a preconfigured resource region, or a resource region indicated by an eNB is called Type 1.

The above mentioned D2D may also be called sidelink, and SA may be called physical sidelink control channel (PSCCH). A D2D synchronization signal may be called sidelink synchronization signal (SSS), and the control channel for transmitting the most basic information before a D2D communication transmitted with the SSS may be called Physical sidelink broadcast channel (PSBCH), or in other name, Physical D2D synchronization channel (PD2DSCH).

A signal for a specific UE to inform that the UE is present in a neighbor may include an ID of the specific UE, and such a channel may be called physical sidelink discovery channel (PSDCH).

In Rel. 12 D2D, only a D2D communication UE transmits PSBCH together with SSS, and owing to this, a measurement of SSS is performed by using a DMRS of PSBCH. An out-coverage UE measures a DMRS of PSBCH and measures RSRP of the signal and determines whether the UE itself becomes a synchronization source.

<NR (New RAT)>

As more communication devices require a greater communication capacity, there emerges a need for enhanced mobile broadband communication compared to the existing radio access technology (RAT). In addition, massive machine type communications (MTC) providing various services anywhere and at any time by connecting multiple devices and things is also one of important issues to be taken into consideration in the next-generation communication. Furthermore, the design of a communication system in which services/UEs sensitive to reliability and latency are taken into consideration is also discussed.

As described above, the introduction of a next-generation RAT in which enhanced mobile broadband (eMBB) communication, massive MTC (mMTC) and ultra-reliable and low latency communication (URLLC) are taken into consideration is now discussed. In the present disclosure, the corresponding technology is commonly called NR, for convenience sake.

<Frame Structure for NR>

Figure 11:
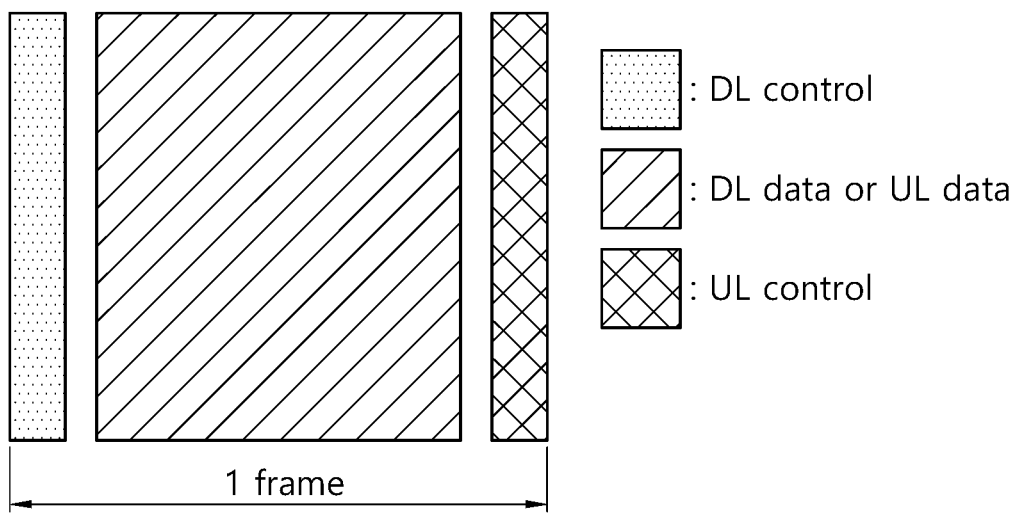
FIG. 11 schematically illustrates an example of a frame structure in the NR system.

FIG. 11 schematically illustrates an example of a frame structure in the NR system.

Referring to FIG. 11, the frame structure of NR is characterized in the self-contained structure that includes all of DL control channel, DL or UL data, UL control channel, and the like in a single frame unit.

At this time, in the DL control channel, DL data scheduling information, UL data scheduling information, and the like may be transmitted, and in the UL control channel, ACK/NACK information for DL data, CSI information (modulation and coding scheme information, MIMO transmission related information, etc.), a scheduling request, and the like may be transmitted.

In FIG. 11, a time gap for DL-to-UL or UL-to-DL switching may be present between the control region and the data region.

In addition, one of DL control/DL data/UL data/UL control may not be configured in a single frame. Alternatively, an order for each channel (e.g., DL control/DL data/UL control/UL data or UL control/UL data/DL control/DL data, etc.) included in a single frame may be changed.

The frame structure of the NR system described with the example of FIG. 8 may be distinguished into 4 types as shown in FIG. 9, largely.

Figure 12:
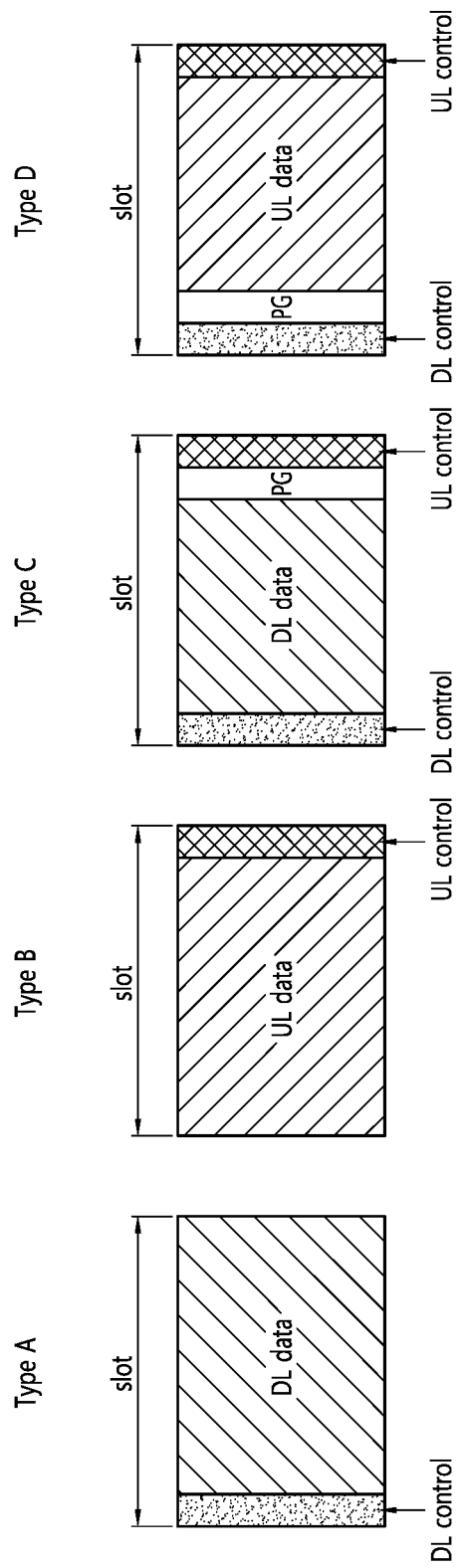
FIG. 12 schematically illustrates another example of a frame structure in the NR system.

FIG. 12 schematically illustrates another example of a frame structure in the NR system.

Type A: DL Control+DL Data

That is, according to Type A, a single slot (or frame) includes a DL control region and a DL data region.

Type B: UL Data+UL Control

That is, according to Type B, a single slot (or frame) includes a UL data region and a UL control region. Here, the UL control may be omitted in dynamic manner.

Type C: DL Control+DL Data+GP (Guard Period)+UL Control

That is, according to Type C, a single slot (or frame) includes a DL control region, a DL data region, a GP (guard period) region and a UL control region.

Type D: DL Control+GP+UL Data+UL Control

That is, according to Type D, a single slot (or frame) includes a DL control region, a GP region, a UL data region and a UL control region. Here, the positions of the UL data and the UL control may be changed, or the UL control may be omitted in dynamic manner.

<Analog Beamforming>

In a millimeter wave (mmW) system, since a wavelength is short, multiple antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, it is available to improve the coverage or throughput by increasing the beamforming (BF) gain using multiple antenna elements.

In this case, in the case that each antenna element may include a transceiver unit (TXRU) to enable adjustment of transmit power and phase, independent beamforming per frequency resource is available. However, installing TXRUs in all of the about 100 antenna elements is less feasible in terms of cost. Therefore, a method of mapping a plurality of antenna elements to one TXRU and adjusting a direction of a beam using an analog phase shifter has been considered. However, the analog beamforming method is disadvantageous in that frequency selective beamforming is impossible because only one beam direction is generated over the entire band.

As an intermediate form of digital beamforming (BF) and analog beamforming (BF), hybrid BF with B TXRUs that are fewer than Q antenna elements may be considered. In this case, the number of beam directions that can be transmitted at the same time is limited to B or less, which depends on the connection scheme of B TXRUs and Q antenna elements.

Hereinafter, the present disclosure will be described.

The aforementioned D2D communication may be extended and applied to signal transmission/reception between vehicles, and communication related to vehicles is specifically called V2X (vehicle-to-everything) communication. In V2X, the term "X" is pedestrian (communication between a vehicle and a device carried by an individual), vehicle (communication between vehicles) (V2V), infrastructure/network (communication between a vehicle and a roadside unit (RSU)/network (ex) RSU is a transportation infrastructure entity (ex) an entity transactions or a stationary UE)) (V2I/N), etc. A device (related to V2P communication) possessed by a pedestrian (or person) is named "P-UE", and a device (related to V2X communication) installed in a vehicle is named "V-UE". In the present disclosure, the term "ENTITY" may be interpreted as at least one of P-UE, V-UE, and RSU (/network/infrastructure).

Here, as an example, a V2X communication mode may be divided into (A) a mode (MODE #3) in which the base station signals (/controls) V2X message transmission (/reception)-related scheduling information (on a V2X resource pool pre-configured (/pre-signaled)) (representatively) (from (the base station (/network))) in case of following a mode (e.g., LTE(A) operated based on an instruction of the base station (e.g., a UE located within base station communication coverage (and/or in an RRC_CONNECTED state) is a main target) and/or (B) a mode (MODE #4) in which a UE (autonomously) determines (/controls) V2X message transmission (/reception)-related scheduling information (a V2X resource pool pre-configured (/pre-signaled) from a base station (/network)) in case where a terminal (or user equipment (UE)) follows a mode (e.g., LTE(A) operated based on sensing or the like with the degree of freedom (e.g., a UE positioned inside/outside base station communication coverage) (and/or of an RRC_CONNECTED/IDLE state) is a main target).

Here, as an example, in the present disclosure, the wording "sensing operation" may be interpreted as a PSSCH DM-RS sequence-based PSSCH-RSRP measurement operation (scheduled by a decoding-successful PSCCH) and/or a (V2X resource pool-related subchannel-based) S-RSSI measurement operation.

Hereinafter, types of V2X services and requirements therefor will be briefly described with reference to the drawings.

Figure 13:
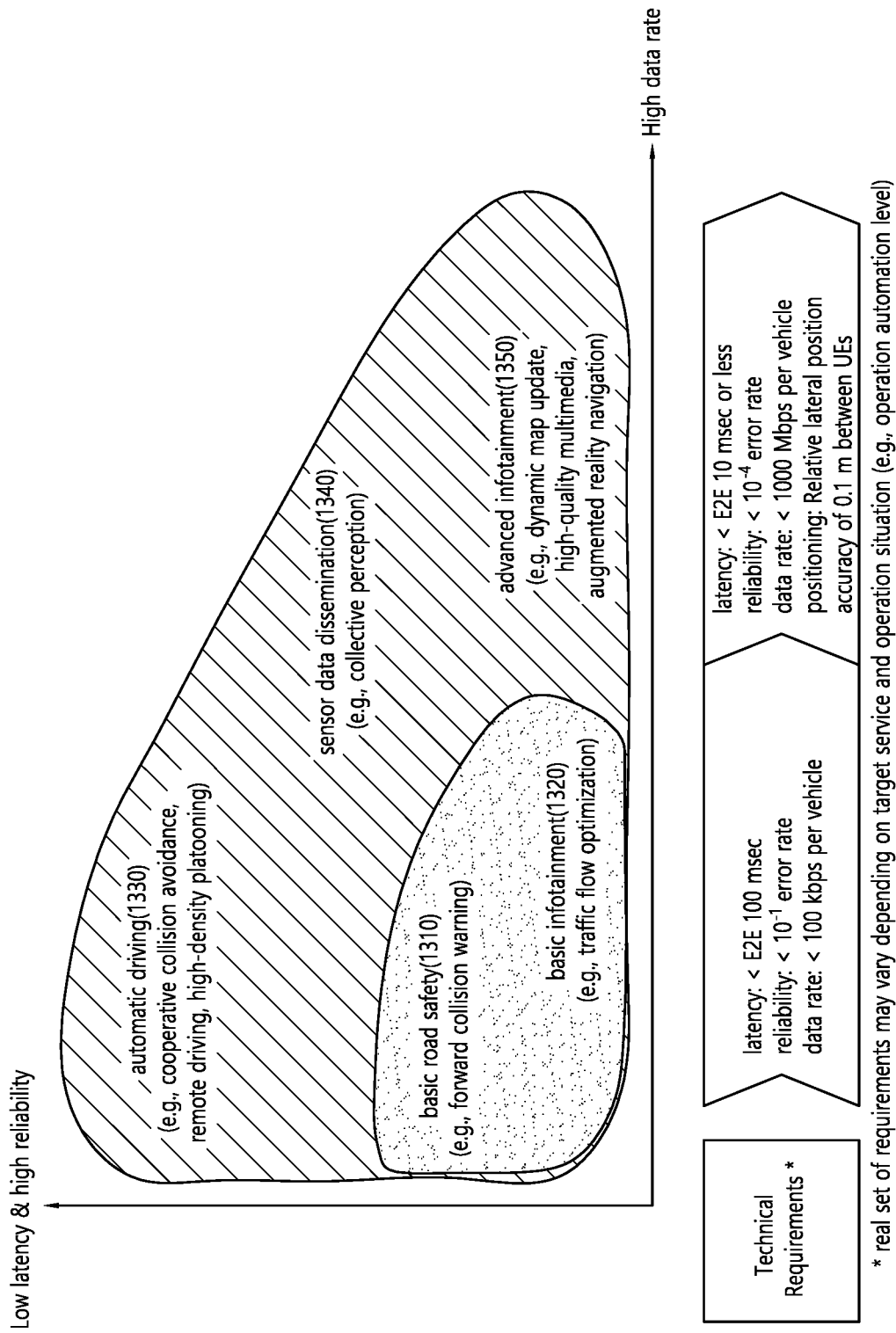
FIG. 13 schematically shows the types of V2X services and requirements for them.

FIG. 13 schematically shows the types of V2X services and requirements for them.

According to FIG. 13, the types of services supported by V2X may be expressed as a graph in which one axis (i.e., a vertical axis in FIG. 13) represents latency and reliability and the other axis (i.e., a horizontal axis in FIG. 13) represents data rate.

First, as an example of the types of services supported by V2X, there may be use cases such as latency less than E2E (end-to-end) 100 msec, reliability less than $10^{-1}$ error rate and/or basic road safety 1310 requiring a data rate less than 100 kbps per vehicle, and/or basic infotainment 1320.

Here, an example of the basic road safety 1310 may include a forward collision warning or the like. An example of the basic infotainment 1320 may include traffic flow optimization or the like.

In addition, as another example of the types of services supported by V2X, there may be use cases such as latency less than E2E 10 msec, reliability less than $10^{-4}$ error rate, a data rate less than 1000 Mbps per vehicle, automated driving 1330 requiring relative position accuracy of 0.1 m between terminals, sensor data dissemination 1340, and/or advanced infotainment 1350.

Here, examples of the automated driving 1330 may include cooperative collision avoidance, remote driving, high-density platooning, and the like. Examples of the sensor data dissemination 1340 may include collective perception or the like. Examples of the advanced infotainment 1350 may include dynamic map update, high-quality multimedia, augmented reality navigation, and the like.

Meanwhile, in a next-generation communication system, various use cases may be supported. For example, services for communication such as autonomous vehicles, smart cars, or connected cars may be considered. For these services, each vehicle may exchange information as a communicatable terminal, select resources for communication with or without a help of a BS, and exchange messages between terminals.

The present disclosure proposes a novel method for reducing transmission errors or channel estimation errors while increasing reliability when transmitting messages or feedback information in vehicle to everything communication.

In the present disclosure, the inventive matters and/or embodiments may be regarded as one proposed method, but a combination between each inventive matter and/or embodiments may also be considered as a new method. In addition, the inventive matters are not limited to the embodiments presented in the present disclosure and are not limited to a specific system. In the case of all (parameter) and/or (operation) and/or (combination between each parameter and/or operation) and/or (whether the corresponding parameter and/or operation is applied) and/or (whether a combination of each parameter and/or operations is applied), the BS may set (in advance) for the terminal through higher layer signaling and/or physical layer signaling or may be defined in a system in advance.

The TTI of the present disclosure may correspond to a unit of various lengths such as a sub-slot/slot/subframe or a basic unit which is a basic unit of transmission, and the terminal of the present disclosure may correspond to various types of devices, such as a vehicle and a pedestrian terminal.

As a method for increasing reliability of a message transmitted by the terminal, a method of bundling and transmitting a plurality of TTIs to accumulate and transmit energy in a time axis may be considered. Hereinafter, the bundling of TTIs will be described with reference to the drawings.

Figure 14:
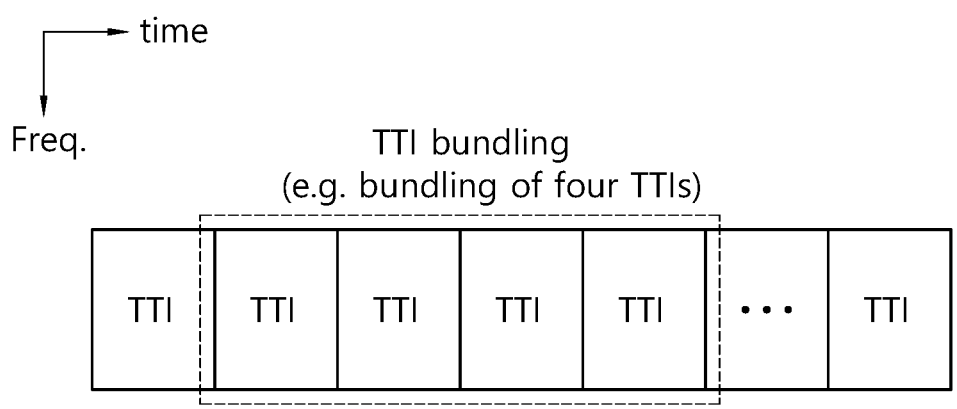
FIG. 14 schematically illustrates an example of TTI bundling.

FIG. 14 schematically illustrates an example of TTI bundling.

According to FIG. 14, the V2X terminal may bundle a plurality of TTIs and transmit data. Here, bundling a plurality of TTIs to transmit data may mean that the terminal repeatedly transmits the same data in each TTI unit within the bundled TTI unit. Here, when the terminal repeatedly transmits the same data, a redundancy version for each data may be different. This may refer to performing a TTI bundling unit when the terminal reserves transmission resources or the base station allocates transmission resources of the terminal in V2X communication.

For convenience of understanding, TTI bundling may be described as follows by applying it to the example of FIG. 14. For example, when four TTIs are bundled, the same data may be repeatedly transmitted for each of a first TTI, a second TTI, a third TTI, and a fourth TTI among the bundled TTIs.

In this connection, whether to apply TTI bundling and/or a size of the TTI bundling unit to be applied and/or whether to perform combining may vary depending on a type of information to be transmitted (e.g., data or feedback information or scheduling information (SA)), and may be pre-defined in the system or pre-configured by the base station and signaled to the terminal via higher layer signaling and/or physical layer signaling or may be notified from the terminal via SA transmission.

When transmitting the feedback information or scheduling information (e.g., SA), a payload size thereof may be relatively smaller compared to that in data transmission, and therefore, a code rate thereof may be relatively lower and thus the feedback information or scheduling information (e.g., SA) may be transmitted more robustly. Thus, when transmitting the feedback information or scheduling information (e.g., SA), the TTI bundling is not considered (i.e., the feedback information or scheduling information is transmitted every TTI) or the TTI bundling of a shorter length than that in data transmission may be applied.

When combining of the SA or feedback information is to be performed, an operation in which the corresponding SA or feedback information may be configured to vary according to the TTI may be disabled. For a payload bit related to the corresponding operation, a known bit may be pre-defined in the system or pre-configured by the base station and transmitted to the terminal via higher layer signaling and/or physical layer signaling, and may be used as a virtual CRC.

In one example, when applying the TTI bundling operation, the transmission environment may change within the period for transmitting the TTI bundling unit. In a case where the terminal performs a V2X operation without considering the change of the transmission environment in a situation where a plurality of TTIs are bundled, and when the change occurs without prior notice, an error may occur when the terminal performs the channel estimation and/or data decoding process.

Thus, in accordance with the present disclosure, in order to solve the above problem, a method in which when the change in the bundled TTIs occurs when the terminal performs the V2X operation based on the TTI bundling, information on changed contents are transmitted is provided. Further, a device using the method is provided. Detailed contents of the method and the device will be described with reference to the drawings.

In this connection, the terminal (e.g., apparatus) may be as follows.

The apparatus may be an (autonomous driving) apparatus that communicates with at least one of a mobile terminal, a network, and another autonomous vehicle other than the apparatus.

Alternatively, the apparatus may be an (autonomous driving) apparatus that implements at least one ADAS (Advanced Driver Assistance System) function based on a signal that controls the motion of the apparatus.

Alternatively, the apparatus may be an (autonomous driving) apparatus that receives a user's input and switches a driving mode of the apparatus from an autonomous driving mode to a manual driving mode or from a manual driving mode to an autonomous driving mode.

Alternatively, the apparatus drives may be an (autonomous driving) apparatus autonomously driving based on external object information, wherein the external object information includes at least one of information on presence or absence of an object, location information of the object, distance information between the apparatus and the object, and relative speed information between the apparatus and the object.

Figure 15:
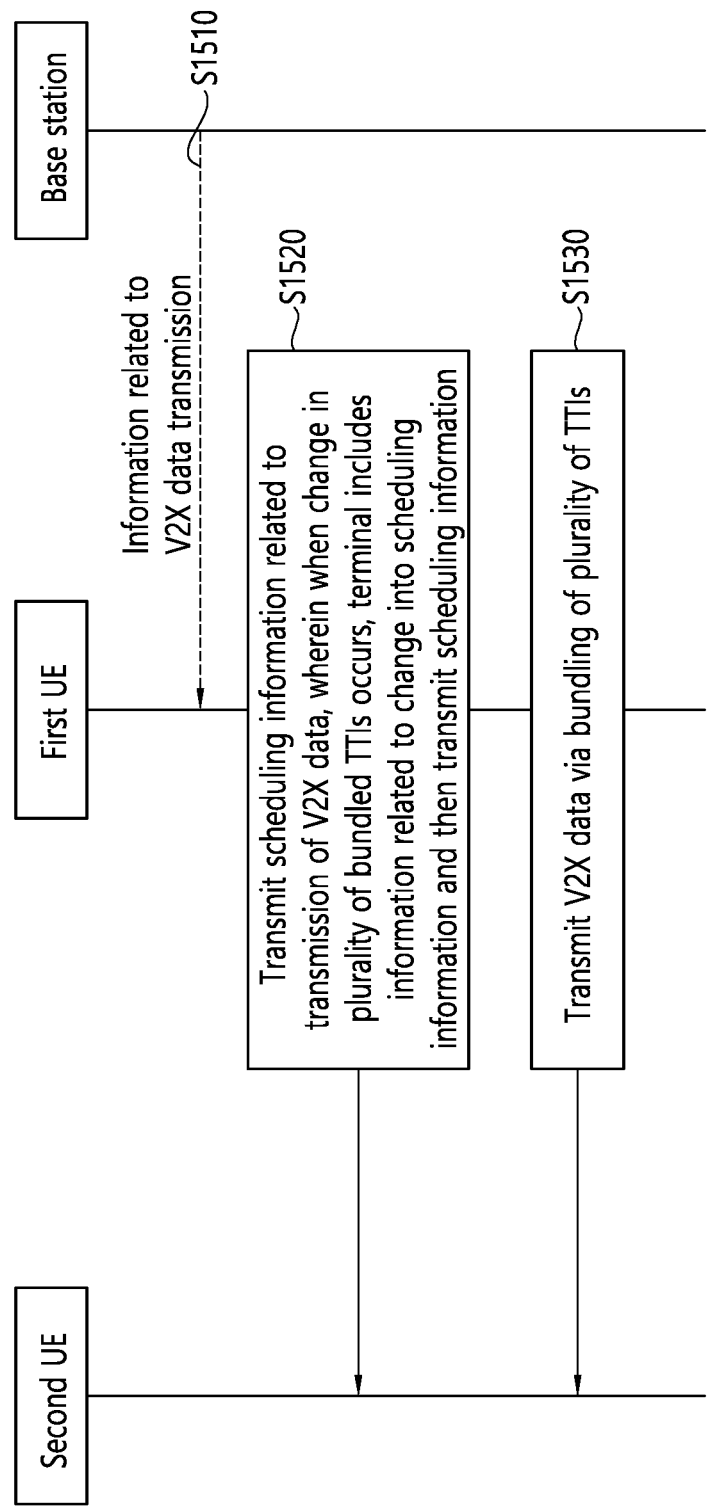
FIG. 15 is a flow chart of a method according to an embodiment of the present disclosure in which when performing the V2X operation via bundling of a plurality of TTIs, information related to change is transmitted.

FIG. 15 is a flow chart of a method according to an embodiment of the present disclosure in which when performing the V2X operation via bundling of a plurality of TTIs, information related to change is transmitted.

According to FIG. 15, the terminal (a first UE in FIG. 15) may receive information related to V2X data transmission from the base station (S1510). In this connection, the terminal may be a terminal that supports the V2X operation (e.g., V2X data transmission/reception, or V2X control information transmission/reception, etc.). In addition, the terminal may be a terminal that supports bundling of a plurality of transmission time intervals (TTIs). Further, the terminal may be a terminal which operates at a degree of freedom based on sensing results or the like. For example, in an example of LTE(A), the terminal may be a terminal (e.g., a mode 4 terminal) which may determine (/control) (by itself) scheduling information related to V2X message transmission (/reception) (on a V2X resource pool as pre-configured or (pre-signaled) by base station/network).

In this connection, the information related to V2X data transmission may be transmitted via higher layer signaling (or physical layer signaling) of the terminal. In this connection, the information related to V2X data transmission may be signaled in a dedicated manner or may be broadcasted. In this connection, for example, the higher layer signaling may be application layer signaling, L3 signaling, L2 signaling, or the like. For example, the physical layer signaling may be L1 signaling.

In one example, the information related to V2X operation does not have to be received by the terminal from the base station. For example, the information related to V2X operation may be pre-configured in the terminal.

Specific examples of the information related to the V2X operation will be described later for convenience of description.

In one example, the terminal may transmit scheduling information (e.g., scheduling assignment (SA)) related to transmission of V2X data (S1520). In this connection, when the change in the plurality of bundled TTIs occurs, the terminal may include information related to the change into the scheduling information and then transmit the scheduling information. In addition, the terminal may repeatedly transmit the V2X data in each of the plurality of TTIs. Alternatively, the terminal may transmit the scheduling information each time in each of the plurality of TTIs or per a predetermined TTI length unit within the plurality of TTIs.

In this connection, there may be two types of information related to change: in one example, 1. information related to power; and in another example, 2. feedback-related information. Accordingly, hereinafter, each of the above two examples will be described in a separate manner, 1. Transmission of Power-Related Information When applying the TTI bundling operation according to the above descriptions, the transmission environment may change within the period for transmitting the TTI bundling unit. For example, when another carrier transmission occurs in a specific TTI, the power must be changed in the corresponding TTI during TTI bundling transmission.

When the change occurs without prior notice, an error may occur during the terminal that receives and decodes the transmission to which the TTI bundling is applied performs channel estimation and/or data decoding. For example, when the TTI bundling is applied, RS for a predetermined period in consideration of a channel coherence time within the TTI bundling unit may be bundled for the channel estimation (However, this may be applied only to the data channel. In this connection, SA for scheduling data channel may be transmitted on each TTI unit basis in consideration of a low code rate, boosted power, and a situation in which each terminal must perform BD. The channel estimation may be performed on each TTI unit basis).

In this connection, when the transmission power is reduced in a specific TTI in the TTI bundle as in the above descriptions, and when the receiving terminal does not know the corresponding situation in which the transmission power is reduced in the specific TTI and then bundles all DMRSs in the TTI bundle unit and performs the channel estimation, channel estimation performance degradation and data decoding errors may occur.

Therefore, the transmitting terminal may inform the receiving terminal of period information for which the power is kept constant in the TTI bundling unit via the SA for scheduling the TTI bundling unit.

To this end, the SA may be transmitted every period (e.g., a single TTI, that is, every TTI) having a unit smaller than the TTI bundling unit. The SA may include the scheduling information about the corresponding period and may be transmitted.

In another example, a 1-bit indicator (a bit indicator may be expressed as bit information) may be included in the SA. An example thereof will be described with reference to the drawings as follows.

Figure 16:
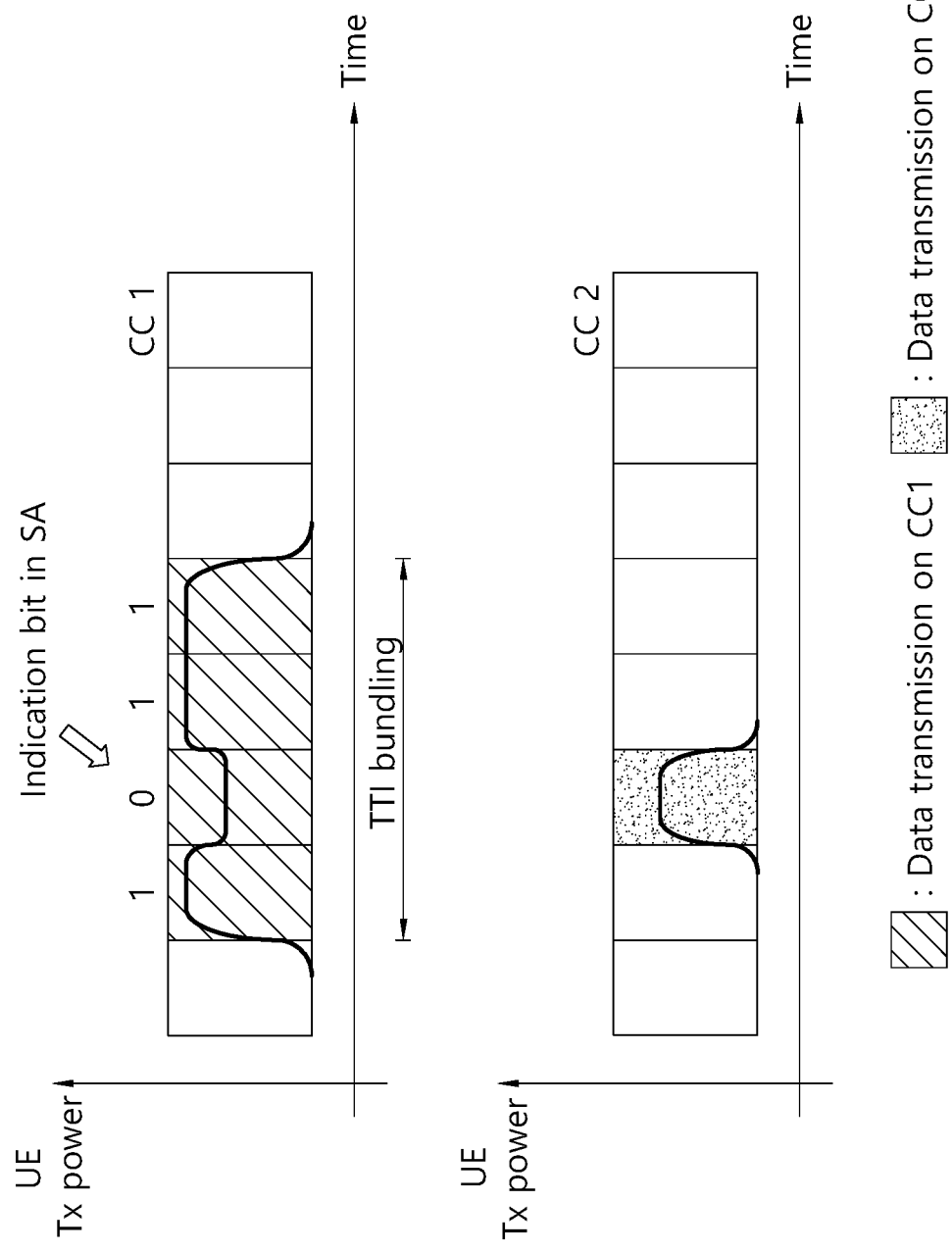
FIG. 16 schematically shows an example in which a 1-bit indicator is included in SA to indicate the power change.

FIG. 16 schematically shows an example in which a 1-bit indicator is included in SA to indicate the power change.

According to FIG. 16, the terminal may use the 1-bit indicator included in the SA to toggle an indication bit in the power change to inform a period for which the power is changed, or maintained to be constant in the TTI bundling unit. In this connection, a length of the period corresponding to a value of the 1-bit indicator may correspond to a period scheduled by the SA.

For example, as shown in the example in FIG. 16, while the terminal performs V2X transmission via TTI bundling (e.g., obtained by bundling 4 TTIs) on a first carrier, the terminal also performs transmission on a second carrier (e.g., performs transmission in a second TTI among the bundled TTIs). In this connection, the terminal may include information in the SA indicating that the transmission environment has changed in the second TTI of the bundled TTIs (that is, due to the transmission on the second carrier, the transmission power on the first carrier has decreased) and may transmit the SA.

Returning to FIG. 15 again, the length of the period for which the power is kept constant may be reported in a form of an index, for example. In this case, the period length corresponding to each index may be pre-defined in the system, or may be preset by the base station and may be singled via higher layer signaling and/or physical layer signaling to the terminal.

In this connection, when traffic to be transmitted to other carriers within the period indicated via SA occurs, the corresponding transmission may be dropped.

Further, in preparation for the case of missing SA, the SA initially indicating the period and period information included in a subsequent SA may represent the same period. For example, when the period length is indicated as 4 in TTI #0, the period lengths may be indicated as 3, 2, and 1 in TTI #1, #2, and #3, respectively.

In addition, after quantizing the power level, the power level in the TTI(s) scheduled by the corresponding SA may be informed in the form of an index, for example via the SA. In this connection, the power level corresponding to each index may be pre-defined in the system, or may be preset by the base station and may be signaled via higher layer signaling and/or physical layer signaling to the terminal.

For example, when a plurality of SAs corresponding to a specific TTI bundling unit indicate different power levels, the terminal may bundle RS only for an period length corresponding to each SA and perform channel estimation and may decode data.

Alternatively, when performing channel estimation for data decoding within the TTI bundling unit, a size of a time axis TTI unit in which RS may be bundled may be reported in the form of an index, for example, via SA, In this case, the TTI unit size corresponding to each index may be pre-defined in the system, or may be preset by the base station and may be signaled via higher layer signaling and/or physical layer signaling to the terminal.

Alternatively, the power-related indication scheme may be applied as it is. For example, the RS may be bundled for a period for which the corresponding bit remains the same via the toggling of the 1-bit indicator, and the channel estimation may be performed. The indication of the period for which the power is kept constant (or is changed) and the indication of the RS bundling period may be individually carried out, or the other indication may be implicitly determined based on one indication.

When SA is transmitted every TTI in the TTI bundling unit, and when the transmission in a specific TTI in the TTI bundling unit is dropped depending on the situation, etc., the SA transmitted in the corresponding TTI may be disabled. Thus, the terminal receiving the corresponding TTI bundling unit may recognize the corresponding situation based on the SA decoding failure in the corresponding TTI. When combining the corresponding TTI bundling unit, the dropped TTI may be excluded.

In one example, when SA is transmitted every period (e.g., a single TTI, that is, every TTI) of a unit smaller than the TTI bundling unit within the TTI bundling unit and when transmission condition in the TTI bundling unit changes according to the above descriptions of the present disclosure, this change may be indicated via the SA. In this case, a payload of the SA may be changed such that SA may not be combined. In this case, since a coverage difference between the data to which TTI bundling is applied and the SA may occur, a method for removing the coverage difference is required.

To solve the difference in coverage, for example, in consideration of the environment, in applying TTI bundling of data, the coverage of the SA may be further increased by boosting the power for the SA transmitted in the corresponding bundling unit (in consideration of the TTI bundling unit of data) or by increasing the frequency RB size of the SA to secure the code rate.

In this way, the transmitting terminal may notify the receiving terminal of the power change in the TTI bundling unit and thus adjust the power more adaptively. Further, the transmitting terminal may notify the receiving terminal of the period for which RS bundling may be performed, thereby improving channel estimation performance or preventing a channel estimation error due to power adjustment. Further, when the power is changed more frequently within the bundled TTI, a power transient period occurs frequently, which may affect data and/or feedback information and/or transmission performance of SA. However, the frequency of power transients may be adjusted according to the transmission situation (or capability) of the terminal. For example, when power is reduced in a specific TTI due to transmission on other carriers, the power in an adjacent TTI may not be immediately increased but may be maintained. This may be considered to indicate whether or not the power is changed via SA.

When the RS sharing operation is applied to reduce the RS overhead for the purpose of lowering the code rate, etc., an indication bit indicating whether to apply the RS sharing operation may be included in SA which in turn may be transmitted. Application of the RS sharing operation may be limited only within a length range in which the power is kept constant.

2. Transmission of Feedback Notification Information

An environment in which each terminal transmits feedback information (the feedback information may mean information about feedback itself) may be considered.

For example, terminals that have received a corresponding message as transmitted may transmit HARQ-ACK information about the corresponding message according to a request based on a service type of the corresponding message. In another example, each terminal may measure a channel environment and feedback information about the channel environment measurement.

For the feedback information, a separate channel may be defined. Then, the feedback information may be transmitted over the corresponding channel. A scheme in which the feedback information may be transmitted over a data transmission channel may also be considered.

Even when the separate channel is defined and then the feedback information is transmitted over the corresponding channel, the feedback information transmission and data transmission may collide with each other at a specific time according to a transmission timing of the feedback information. In this case, the feedback information may be piggybacked on the data channel and transmitted thereon.

In one example, when the TTI bundling is applied to the feedback information transmission on the data channel, it is necessary to consider how to transmit the feedback information. First, the feedback information transmission has a lower code rate than that of the data transmission and thus the feedback information may be transmitted robustly. Thus, when transmitting the feedback information, the TTI bundling is not considered (that is, the feedback information may be transmitted in the TTI unit), or the TTI bundling of the shorter length than that in the data transmission may be applied. Therefore, when the feedback information is transmitted on the data channel as described above, the feedback information may be mapped to a specific TTI in the TTI bundling unit.

In the NR system, uplink multi-slot PUSCH transmission and PUCCH transmission may collide with each other at a specific time. In this case, For the collision slot, the UCI may be first piggybacked and transmitted on a first symbol excluding a DMRS symbol after a first DMRS in the corresponding slot in a frequency-first manner. Under the mapping in the frequency-first scheme, the feedback information may be transmitted in a specific TTI in the TTI bundling unit in a concentrated manner. For example, when data having a higher priority is transmitted on another carrier in the TTI to which the feedback information is mapped, the power for the transmission in the corresponding TTI within the corresponding TTI bundling may be reduced or the transmission in the corresponding TTI may be dropped. Thus, in this case, the transmission may be concentrated on the corresponding TTI and thus the transmission of the mapped feedback information may be affected entirely.

Therefore, considering an environment in which the feedback information is transmitted on the data channel to which the TTI bundling is applied, the feedback information may be mapped to the TTI bundling period in a time-first scheme. In this case, the feedback information may be mapped to the entire TTI bundling period without separate indication.

In addition, the TTI to which the time-first mapping is applied may be variable within the TTI bundling unit. Period information to which such time-first mapping is applied may be transmitted via SA. For example, the period information may be transmitted in a form of a starting point and a period length, such as RIV (resource indication value). Each index of the TTI to which the feedback information is mapped may be indicated, or a combination of TTIs may be indicated in the form of an index.

In this connection, the period information corresponding to each index, and/or combination information of TTIs may be predefined in the system, or may be pre-configured by the base station and may be signaled via higher layer signaling and/or physical layer signaling to the terminal. In addition, whether the feedback information is included in the data corresponding to the corresponding SA and transmitted therein may be indicated via the SA.

The above descriptions may be applied to the mapping in the frequency-first scheme.

For example, entire feedback information may be mapped to a single TTI in the frequency-first scheme. In this connection, the index of the TTI to which the corresponding feedback information is mapped may be indicated via the SA.

In one example, when the entire feedback information is mapped to a single TTI in the frequency-first scheme, an approach for a case in which the feedback transmission fails in the single TTI due to another carrier may be required. Accordingly, the approach for the failure of the feedback transmission will be described with reference to the drawing.

Figure 17:
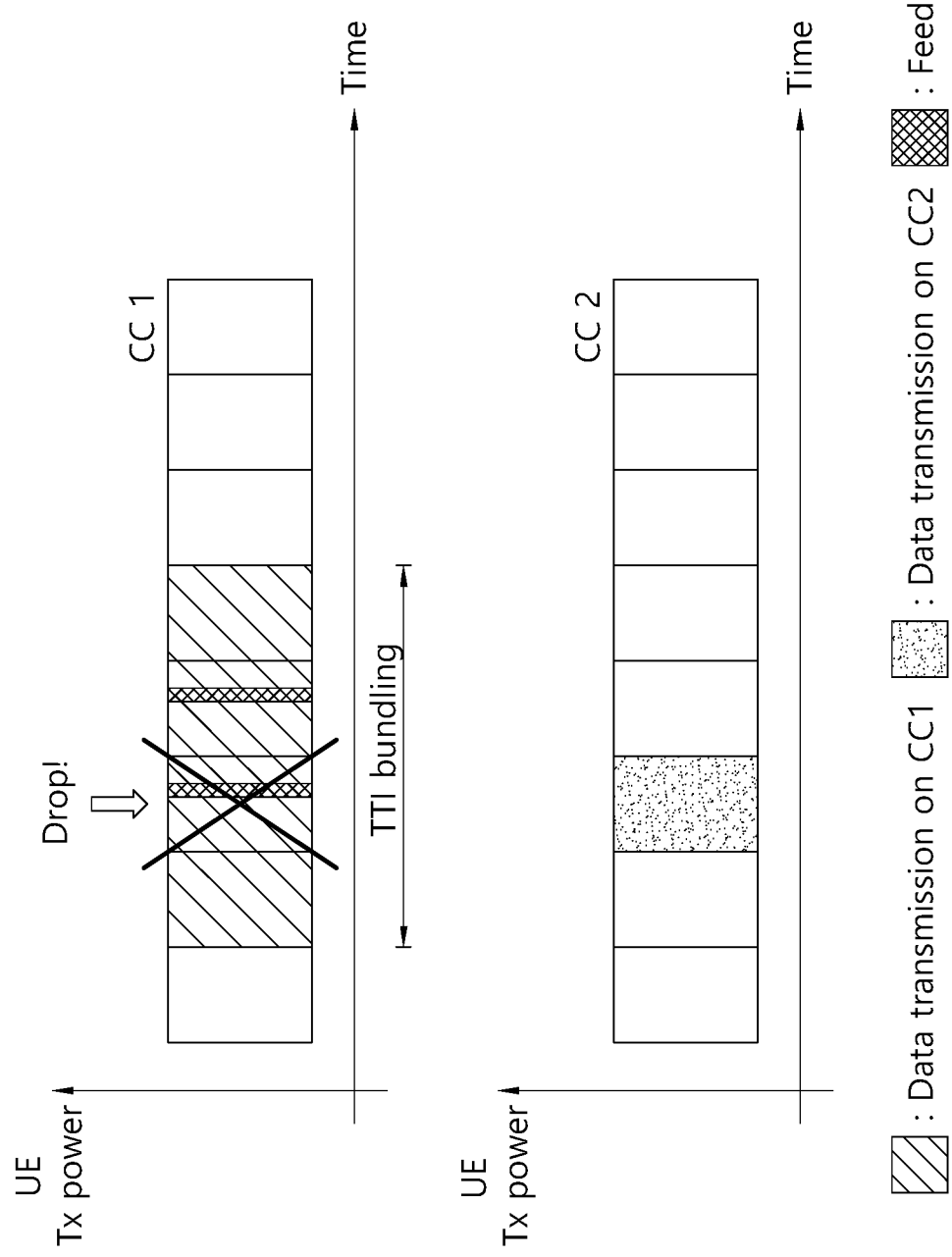
FIG. 17 schematically shows an example of the approach for the case in which the feedback transmission in a single TTI fails.

FIG. 17 schematically shows an example of the approach for the case in which the feedback transmission in a single TTI fails.

As in the example in FIG. 17, in a situation where data is transmitted under application of the TTI bundling, when the feedback information is intended to be transmitted at a timing pre-defined in the system or pre-indicated (as in this example, the corresponding timing may correspond to a specific time in the TTI bundling unit), transmission having a higher priority on other carriers may occur such that the transmission in the TTI of the corresponding timing may be dropped from transmission in the TTI bundling unit.

In this connection, the terminal may transmit the feedback information in an adjacent TTI within the TTI bundling unit (in this example, the adjacent TTI in which transmission on other carriers is absent in the TTI bundling unit), and may indicate that the feedback information is transmitted in the corresponding TTI via the SA transmitted in the corresponding adjacent TTI.

In this connection, when the timing at which the corresponding feedback transmission is expected to be received is present within the TTI bundling transmission unit, and when the decoding of the feedback information fails at that timing, the terminal receiving (or expecting the reception of) the feedback information may be expected that the corresponding feedback information will be transmitted in the adjacent TTI within the corresponding TTI bundling unit, and may know whether the feedback information is actually transmitted, via decoding of the SA transmitted in the adjacent TTI under the above operation.

In one example, an operation in which feedback information is mapped to a single TTI in the frequency-first scheme may be considered. RV is fixed for each TTI via transmission of the TTI bundling unit, and data is repeatedly transmitted and a chase combining operation may be applied. In this case, when feedback information is mapped to a specific TTI, data at the same location as the corresponding RE may be rate-matched or punctured in other TTIs. This may be applied in the same way when the feedback information is repeatedly transmitted within the TTI bundling unit.

Returning to FIG. 15 again, the terminal may transmit the V2X data via bundling of the plurality of TTIs (S1530). In this connection, a specific example in which the terminal transmits the V2X data via the bundling of a plurality of TTIs is the same as described above, and therefore, for convenience of description, repeated descriptions of the duplicated content will be omitted.

The example of FIG. 15 will be described in terms of a terminal (V2X terminal) as follows.

Figure 18:
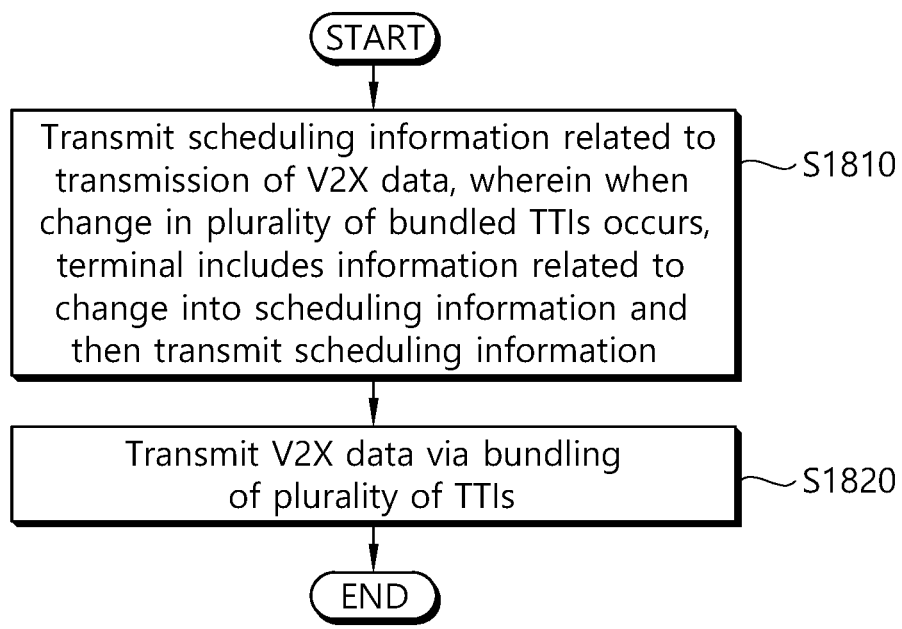
FIG. 18 is a flow chart of a method in which the terminal transmits information related to change when the terminal performs the V2X operation via bundling of a plurality of TTIs according to an embodiment of the present disclosure.

FIG. 18 is a flow chart of a method in which the terminal transmits information related to change when the terminal performs the V2X operation via bundling of a plurality of TTIs according to an embodiment of the present disclosure.

According to FIG. 18, the terminal may transmit scheduling information related to V2X data transmission (S1810). In this connection, when the change in the plurality of bundled TTIs occurs, the terminal may include information related to the change into the scheduling information and then transmit the scheduling information. A specific example in which the terminal includes the information related to the change into the scheduling information and transmits the same is the same as described above, and therefore, for convenience of description, repeated description of the overlapping description will be omitted.

The terminal may transmit the V2X data via bundling of the plurality of TTIs (S1620). In this connection, a specific example in which the terminal transmits the V2X data via bundling of the plurality of TTIs is the same as described above, and therefore, for convenience of description, repeated descriptions of duplicate descriptions will be omitted.

Figure 19:
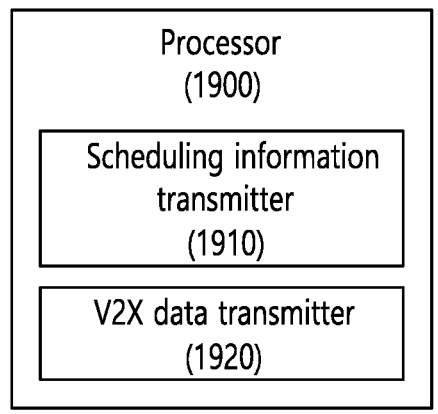
FIG. 19 shows an example of a block diagram of an apparatus (terminal) that transmits information related to change when performing a V2X operation via bundling of a plurality of TTIs according to an embodiment of the present disclosure.

FIG. 19 shows an example of a block diagram of an apparatus (terminal) that transmits information related to change when performing a V2X operation via bundling of a plurality of TTIs according to an embodiment of the present disclosure.

According to FIG. 19, the processor 1900 may include a scheduling information transmitter 1910 and a V2X data transmitter 1920. In this connection, the processor 1900 may mean a processor in FIG. 22 to FIG. 31 to be described later.

The scheduling information transmitter 1910 may be configured to transmit scheduling information related to transmission of V2X data. In this connection, when the change in the plurality of bundled TTIs occurs, the terminal may include the information related to the change into the scheduling information and transmit the scheduling information. A specific example in which the terminal includes the information related to the change into the scheduling information and transmits the scheduling information is the same as described above, and therefore, for convenience of description, repeated description of the overlapping description will be omitted.

The V2X data transmitter 1920 may transmit the V2X data via bundling of the plurality of TTIs. In this connection, a specific example in which the terminal transmits the V2X data via bundling of the plurality of TTIs is the same as described above, and therefore, for convenience of description, repeated descriptions of duplicate descriptions will be omitted.

The example of FIG. 15 will be described in terms of the base station as follows.

Figure 20:
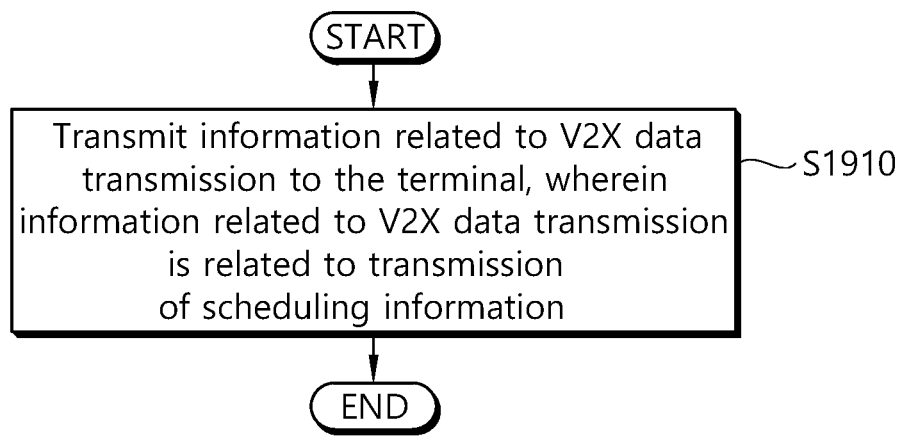
FIG. 20 is a flowchart of a method in which a base station transmits the information related to V2X data transmission according to an embodiment of the present disclosure.

FIG. 20 is a flowchart of a method in which a base station transmits the information related to V2X data transmission according to an embodiment of the present disclosure.

According to FIG. 20, the base station may transmit information related to V2X data transmission to the terminal (S2010). In this connection, the information related to the V2X data transmission may be information related to the transmission of scheduling information. A specific example of the information related to the transmission of the V2X data as transmitted from the base station is the same as described above. Thus, repeated description of the overlapping description will be omitted for convenience of description.

Figure 21:
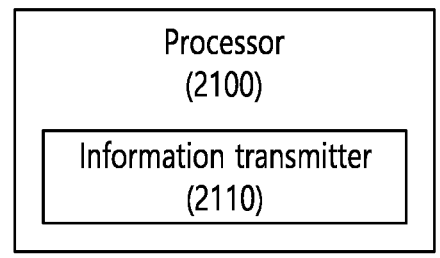
FIG. 21 is an example of a block diagram of an apparatus (the base station) for transmitting information related to V2X data transmission according to an embodiment of the present disclosure.

FIG. 21 is an example of a block diagram of an apparatus (the base station) for transmitting information related to V2X data transmission according to an embodiment of the present disclosure.

According to FIG. 21, a processor 2100 may include an information transmitter 2110. In this connection, the processor 2100 may mean a processor in FIG. 22 to FIG. 31 to be described later.

The information transmitter 2110 may be configured to transmit the information related to V2X data transmission to the terminal. In this connection, the information related to the V2X data transmission may be information related to the transmission of scheduling information. Since a specific example of the information related to the transmission of the V2X data transmitted from the base station is the same as described above, repeated description of the overlapping description will be omitted for convenience of description.

Although not limited thereto, the various proposals of the present disclosure as described above may be applied to various fields requiring wireless communication/connection (e.g., 5G) between the apparatuses.

Hereinafter, the present disclosure will be illustrated in more detail with reference to the drawings. In the following drawings/descriptions, the same reference numerals may denote the same or corresponding hardware block, software block, or functional block, unless otherwise indicated.

Figure 22:
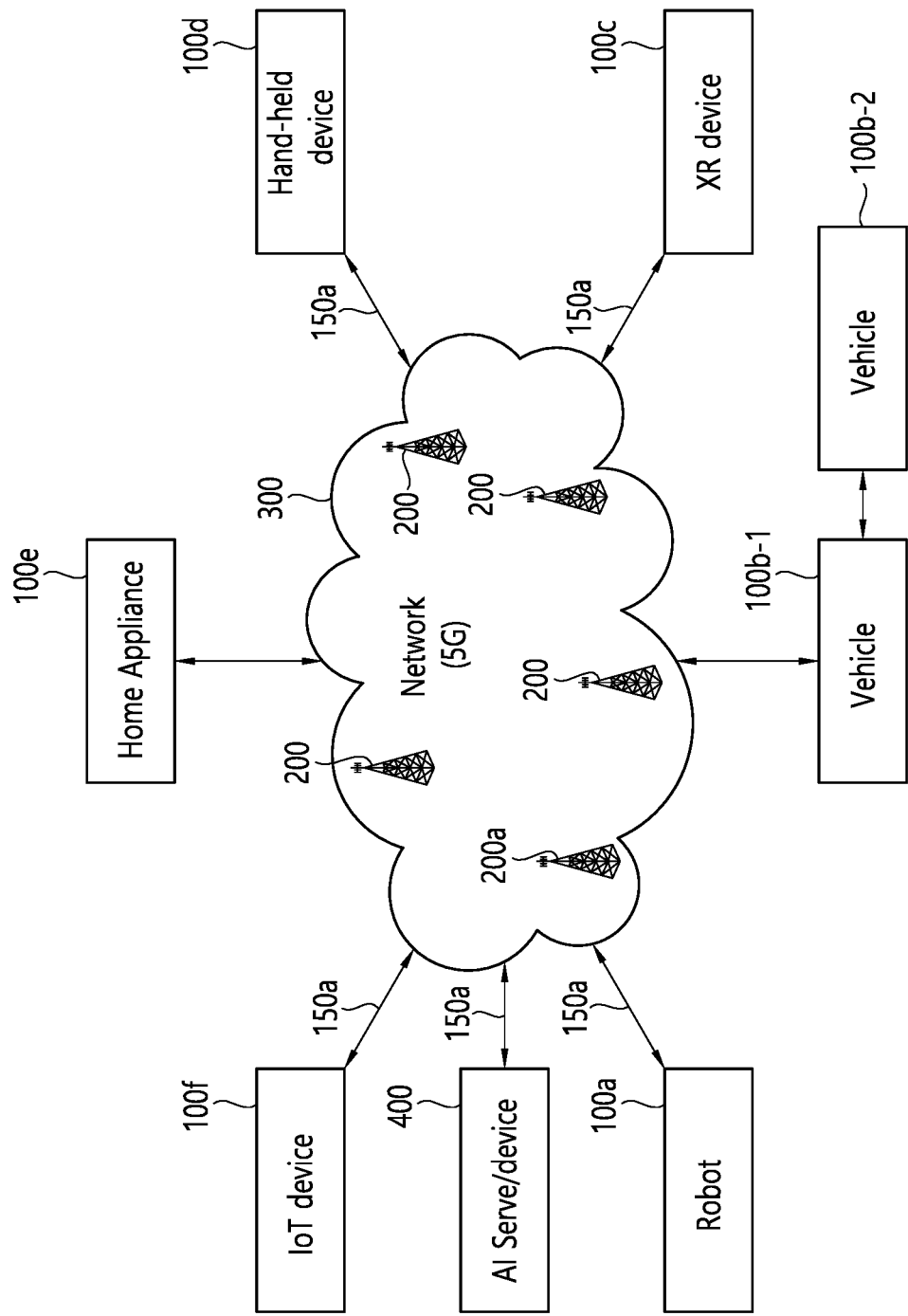
FIG. 22 illustrates a communication system 1 applied to the present disclosure.

FIG. 22 illustrates a communication system 1 applied to the present disclosure.

Referring to FIG. 22, a communication system 1 applied to the disclosure includes a wireless device, a base station, and a network. Here, the wireless device refers to a device that performs communication using a wireless access technology (e.g., 5G new RAT (NR) or long term evolution (LTE) and may be referred to as a communication/wireless/ 5G device. Although not limited thereto, the wireless devices may include a robot 100a, vehicles 100b-1 and 100b-2, an extended reality (XR) device 100c, a hand-held device 100d, a home appliance 100e, an Internet of things (IoT) device 100f, and an AI device/server 400. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device may include augmented reality (AR)/virtual reality (VR)/mixed reality (MR) devices and may be implemented in the form of a head-mounted device (HMD), a head-up display (HUD) TV provided in a vehicle, a smartphone, a computer, a wearable device, a home appliance, a digital signage, a vehicle, a robot, and the like. Portable devices may include a smartphone, a smart pad, a wearable device (e.g., smart watch, smart glasses), a computer (e.g., notebook computer), etc. Home appliances may include a TV, a refrigerator, and a washing machine. IoT devices may include a sensor, a smart meter, and the like. For example, the base station and the network may be implemented as a wireless device, and a specific wireless device 200a may operate as a base station/network node for other wireless devices.

The wireless devices 100a to 100f may be connected to a network 300 through a base station 200. An artificial intelligence (AR) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other through the base station 200/network 300 but may communicate directly (e.g. sidelink communication) without passing through the base station/network. For example, the vehicles 100b-1 and 100b-2 may perform direct communication (e.g. V2V (vehicle to vehicle)/V2X (vehicle to everything) communication). In addition, an IoT device (e.g., sensor) may directly communicate with other IoT devices (e.g., sensors) or other wireless devices 100a to 100f.

Wireless communication/connections 150a and 150b may be established between the wireless devices 100a to 100f/ base station 200 and the base station 200/wireless devices 100a to 100f. Here, wireless communication/connection may be performed through various wireless access technologies (e.g., 5G NR) for uplink/downlink communication 150a and sidelink communication 150b (or D2D communication). Through the wireless communication/connection 150a and 150b, the wireless device and the base station/wireless device may transmit/receive wireless signals to each other. For example, the wireless communication/connections 150a and 150b may transmit/receive signals through various physical channels based on the entire/partial process of FIG. A1. To this end, based on various suggestions of the present disclosure, at least some of various configuration information configuring processes for transmission/reception of wireless signals, various signal processing processes (e.g., channel encoding/decoding, modulation/demodulation, resource mapping/demapping, etc.), and a resource allocation process, etc. may be performed.

Figure 23:
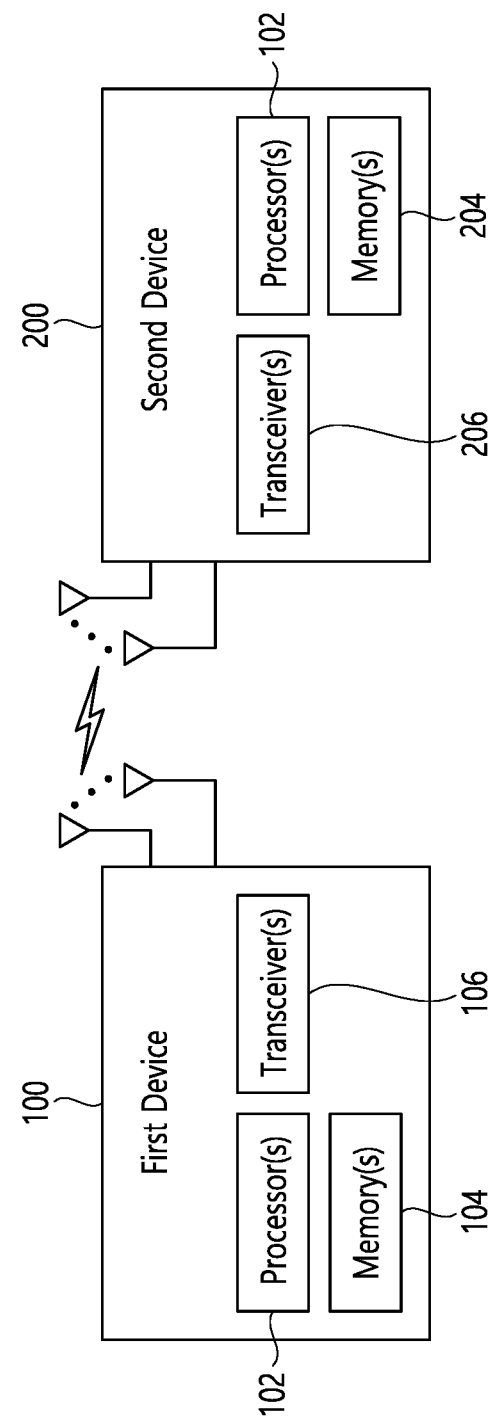
FIG. 23 illustrates a wireless device applicable to the present disclosure.

FIG. 23 illustrates a wireless device applicable to the present disclosure.

Referring to FIG. 23, a first device 100 and a second device 200 may transmit and receive wireless signals through various wireless access technologies (e.g., LTE and NR). Here, {the first device 100, the second device 200} may correspond to {wireless device 100x, base station 200} and/or {wireless device 100x, wireless device 100x) of FIG. 22}.

The first device 100 may include one or more processors 102 and one or more memories 104 and may further include one or more transceivers 106 and/or one or more antennas 108. The processor 102 may be configured to control the memory 104 and/or the transceiver 106 and may be configured to implement the functions, procedures, and/or methods described/suggested above. For example, the processor 102 may process information in the memory 104 to generate first information/signal and then transmit a wireless signal including the first information/signal through the transceiver 106. In addition, the processor 102 may receive a wireless signal including second information/signal through the transceiver 106 and then store information obtained from signal processing of the second information/signal in the memory 104. The memory 104 may be connected to the processor 102 and may store various information related to the operation of the processor 102. For example, the memory 104 may store software code including instructions for performing some or all of the processes controlled by the processor 102 or performing the previously described/suggested procedures and/or methods. Here, the processor 102 and the memory 104 may be part of a communication modem/circuit/chip designed to implement wireless communication technology (e.g., LTE, NR). The transceiver 106 may be connected with the processor 102 and may transmit and/or receive wireless signals through one or more antennas 108. The transceiver 106 may include a transmitter and/or a receiver. The transceiver 106 may be used with a radio frequency (RF) unit. In the present disclosure, the wireless device may refer to a communication modem/ circuit/chip.

The second device 200 may include one or more processors 202 and one or more memories 204 and may further include one or more transceivers 206 and/or one or more antennas 208. The processor 202 may be configured to control the memory 204 and/or the transceiver 206 and may be configured to implement the functions, procedures, and/ or methods described/suggested above. For example, the processor 202 may process information in the memory 204 to generate first information/signal and then transmit a wireless signal including the first information/signal through the transceiver 206. In addition, the processor 202 may receive a wireless signal including second information/ signal through the transceiver 206 and then store information obtained from signal processing of the second information/signal in the memory 204. The memory 204 may be connected to the processor 202 and may store various information related to the operation of the processor 202. For example, the memory 204 may store software code including instructions for performing some or all of the processes controlled by the processor 202 or performing the previously described/suggested procedures and/or methods. Here, the processor 202 and the memory 204 may be part of a communication modem/circuit/chip designed to implement wireless communication technology (e.g., LTE, NR). The transceiver 206 may be connected with the processor 202 and may transmit and/or receive wireless signals through one or more antennas 208. The transceiver 206 may include a transmitter and/or a receiver. The transceiver 206 may be used with a radio frequency (RF) unit. In the present disclosure, the wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the functions, procedures, suggestions, and/or methods disclosed in this document. One or more processors 102 and 202 may generate messages, control information, data, or information according to the functions, procedures, suggestions and/or methods disclosed herein. One or more processors 102 and 202 may generate a signal (e.g., baseband signal) containing a PDU, an SDU, a message, control information, data or information according to the functions, procedures, suggestions and/or methods disclosed herein and provide the same to one or more transceivers 106 and 206. One or more processors 102 and 202 may receive signals (e.g., baseband signals) from one or more transceivers 106 and 206 and obtain an PDU, a SDU, a message, control information, data or information according to the functions, procedures, suggestions and/or methods disclosed herein.

The one or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The functions, procedures, suggestions and/or methods disclosed in this document may be implemented using firmware or software, and firmware or software may be implemented to include modules, procedures, functions, and the like. Firmware or software configured to perform the functions, procedures, suggestions and/or methods disclosed in this document may be included in one or more processors 102 and 202, may be stored in one or more memories 104 and 204, and may be driven by one or more processors 102 and 202. The functions, procedures, suggestions and or methods disclosed in this document may be implemented using firmware or software in the form of codes, instructions and/or a set of instructions.

One or more memories 104, 204 may be connected to one or more processors 102 and 202 and may store various types of data, signals, messages, information, programs, codes, instructions, and/or commends. One or more memories 104 and 204 may include ROM, RAM, EPROM, flash memory, hard drive, registers, cache memory, computer readable storage medium, and/or combinations thereof. One or more memories 104 and 204 may be located inside and/or outside one or more processors 102 and 202. In addition, one or more memories 104 and 204 may be connected to one or more processors 102, 202 through various technologies such as wired or wireless connection.

The one or more transceivers 106 and 206 may transmit user data, control information, wireless signals/channels, and the like mentioned in the methods and/or operation flowcharts of this document to one or more other devices. The one or more transceivers 106 and 206 may receive user data, control information, wireless signals/channels, and the like mentioned in the functions, procedures, suggestions, methods and/or operational flowcharts, etc. disclosed herein from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102 and 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, etc. mentioned in the functions, procedures, suggestions, methods and/or operational flowcharts disclosed in this document. In this document, one or more antennas may be a plurality of physical antennas or a plurality of logical antennas (e.g., antenna ports). One or more transceivers 106 and 206 may convert received wireless signal/channel from an RF band signal into a baseband signal in order to process received user data, control information, wireless signals/channels, etc. using one or more processors 102 and 202. One or more transceivers 106 and 206 may convert user data, control information, wireless signals/channels, etc. processed using one or more processors 102 and 202 from a baseband signal to an RF band signal. To this end, one or more of the transceivers 106 and 206 may include (analog) oscillators and/or filters.

Figure 24:
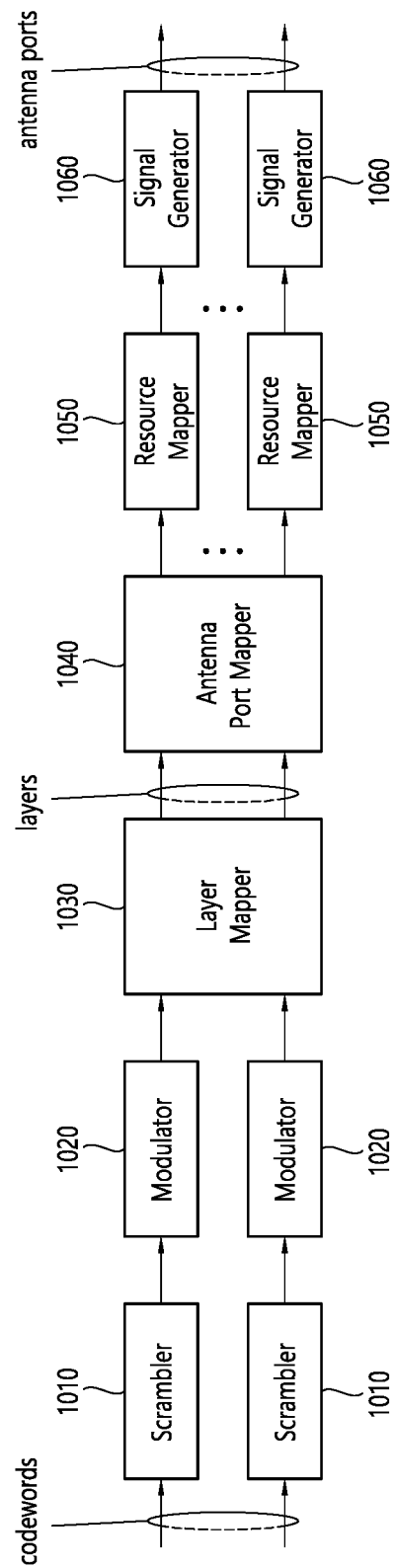
FIG. 24 illustrates a signal processing circuit for a transmission signal.

FIG. 24 illustrates a signal processing circuit for a transmission signal.

Referring to FIG. 24, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 24 may be performed in the processors 102 and 202 and/or the transceivers 106 and 206 of FIG. 23. The hardware elements of FIG. 24 may be implemented in the processors 102 and 202 and/or the transceivers 106 and 206 of FIG. 23. For example, blocks 1010 to 1060 may be implemented in the processors 102 and 202 of FIG. 23. Also, blocks 1010 to 1050 may be implemented in the processors 102 and 202 of FIG. 23, and block 1060 may be implemented in the transceivers 106 and 206 of FIG. 23.

A codeword may be converted into a wireless signal through the signal processing circuit 1000 of FIG. 24. Here, the codeword is an encoded bit sequence of an information block. The information block may include a transport block (e.g., a UL-SCH transport block, a DL-SCH transport block). The wireless signal may be transmitted through various physical channels (e.g., PUSCH and PDSCH) of FIG. A1.

Specifically, the codeword may be converted into a scrambled bit sequence by the scrambler 1010. The scramble sequence used for scramble may be generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. Modulation symbols of each transport layer may be mapped to corresponding antenna port(s) by the precoder 1040 (precoding). An output z of the precoder 1040 may be obtained by multiplying an output y of the layer mapper 1030 by an N*M precoding matrix W. Here, N is the number of antenna ports, and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols, DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an Inverse fast Fourier transform (IFFT) module and a cyclic prefix (CP) inserter, a digital-to-analog converter (DAC), a frequency uplink converter, and the like.

A signal processing process for a received signal in the wireless device may be configured as the reverse of the signal processing process 1010 to 1060 of FIG. 24. For example, the wireless device (e.g., 100 or 200 in FIG. 23) may receive a wireless signal from the outside through an antenna port/transceiver. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be reconstructed into a codeword through a resource de-mapper process, a postcoding process, a demodulation process, and a descramble process. The codeword may be restored to an original information block through decoding. Accordingly, a signal processing circuit (not shown) for a reception signal may include a signal restorer, a resource demapper, a postcoder, a demodulator, a descrambler, and a decoder.

Figure 25:
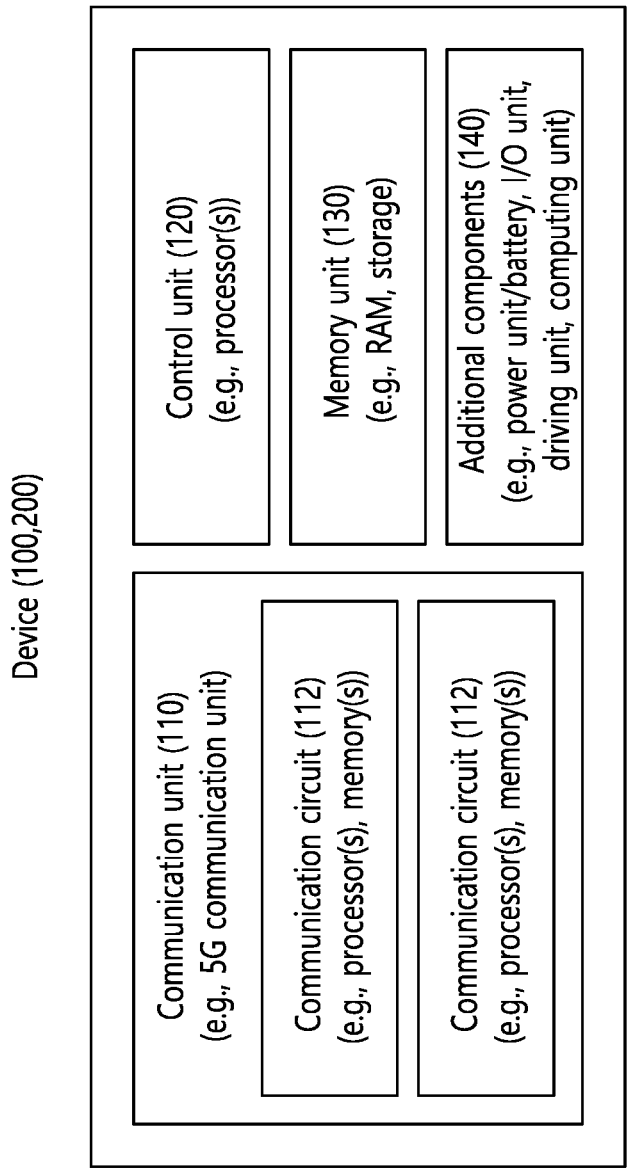
FIG. 25 shows another example of a wireless device applied to the present disclosure.

FIG. 25 shows another example of a wireless device applied to the present disclosure. The wireless devices may be implemented in various forms according to use-examples/services (see FIGS. 21 and 25 to 30).

Referring to FIG. 25, the wireless devices 100 and 200 correspond to the wireless devices 100 and 200 of FIG. 23 and may include various elements, components, units/units, and/or modules. For example, the wireless devices 100 and 200 may include a communication unit 110, a control unit 120, a memory unit 130, and an additional component 140. The communication unit may include a communication circuit 112 and a transceiver(s) 114. For example, communication circuit 112 may include one or more processors 102 and 202 and/or one or more memories 104 and 204 of FIG. 23. For example, the transceiver(s) 114 may include one or more transceivers 106 and 206 and/or one or more antennas 108 and 208 of FIG. 23. The control unit 120 may be electrically connected to the communication unit 110, the memory unit 130, and the additional component 140 and control general operations of the wireless device. For example, the control unit 120 may control the electrical/mechanical operation of the wireless device based on the program/code/command/information stored in the memory unit 130. In addition, the control unit 120 may transmit the information stored in the memory unit 130 to the outside (e.g., other communication device) via the communication unit 110 through a wireless/wired interface or store information received from the outside (e.g., other communication device) via the communication unit 110 through a wireless/wired interface in the memory unit 130.

The additional component 140 may be variously configured according to the type of wireless device. For example, the additional component 140 may include at least one of a power unit/battery, an I/O unit, a driving unit, and a computing unit. Although not limited thereto, the wireless device may be implemented in the form of the robot (FIGS. 21, 100a), the vehicles (FIGS. 21, 100b-1, 100b-2), the XR device (FIGS. 21, 100c), the portable device (FIGS. 21, 100d), the home appliance (100e of FIG. 22), the IoT device (100f of FIG. 22), a digital broadcasting terminal, a hologram device, a public safety device, an MTC device, a medical device, a fintech device (or financial device), a security device, a climate/environment device, an AI server/device (400 of FIG. 22), a base station (200 of FIG. 22), and a network node. The wireless device may be a mobile device or may be used in a fixed place depending on the use-example/service.

In FIG. 25, the various elements, components, units/units, and/or modules in the wireless devices 100 and 200 may all be interconnected through a wired interface, or at least some of them may be wirelessly connected through the communication unit 110. For example, in the wireless devices 100 and 200, the control unit 120 and the communication unit 110 may be connected by wire, and the control unit 120 and the first units (e.g., 130 and 140) may be connected wirelessly through the communication unit 110. In addition, each element, component, unit/unit, and/or module in the wireless devices 100 and 200 may further include one or more elements. For example, the control unit 120 may be configured as one or more processor sets. For example, the control unit 120 may include a set of a communication control processor, an application processor, an electronic control unit (ECU), a graphic processing processor, and a memory control processor. As another example, the memory unit 130 may include a random access memory (RAM), a dynamic RAM (DRAM), a read only memory (ROM), a flash memory, a volatile memory, and a non-volatile memory, and/or a combination thereof.

Hereinafter, an implementation example of FIG. 25 will be described in more detail with reference to the drawings.

Figure 26:
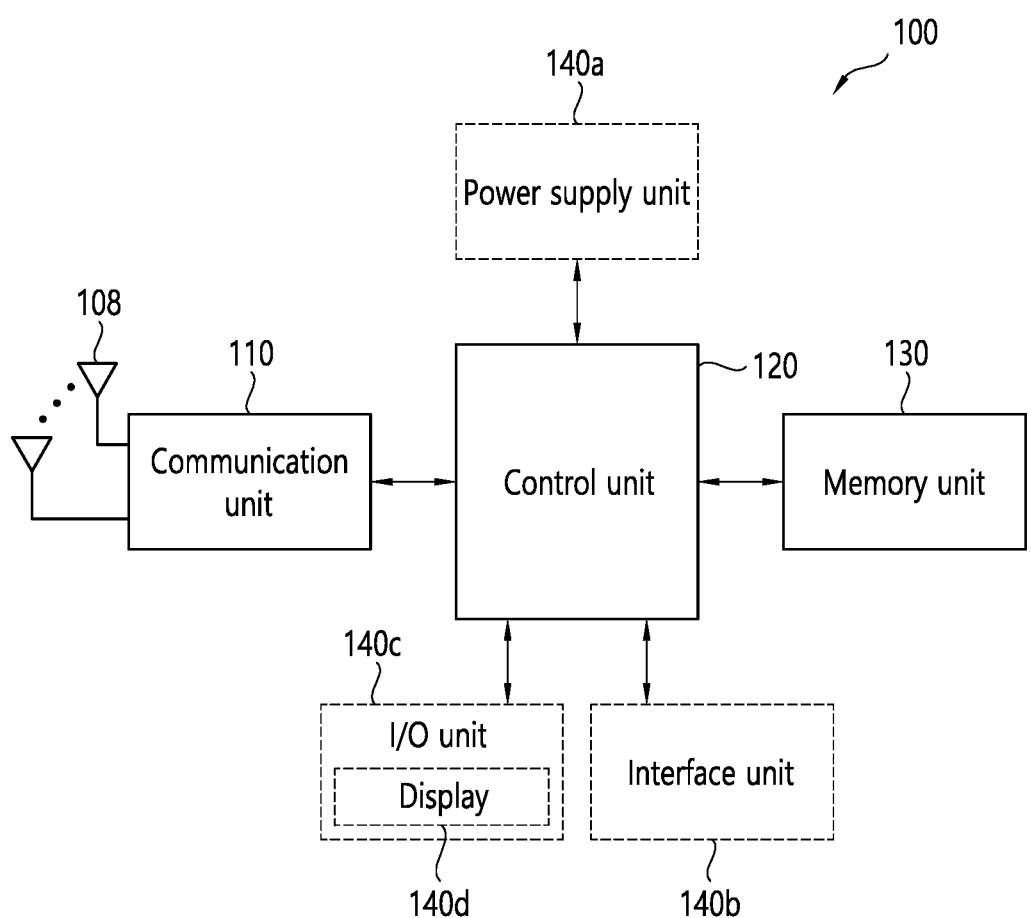
FIG. 26 illustrates a portable device applied to the present disclosure.

FIG. 26 illustrates a portable device applied to the present disclosure. The portable device may include smart phones, smart pads, wearable devices (e.g., smart watches, smart glasses), and portable computers (e.g., notebook computers). The portable device may be referred to as a mobile station (MS), a user terminal (UT), a mobile subscriber station (MSS), a subscriber station (SS), an advanced mobile station (AMS), or a wireless terminal (WT).

Referring to FIG. 26, the portable device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to blocks 110 to 130/140 of FIG. 25, respectively.

The communication unit 110 may transmit and receive signals (e.g., data, control signals, etc.) with other wireless devices and base stations. The control unit 120 may perform various operations by controlling components of the portable device 100. The control unit 120 may include an application processor (AP). The memory unit 130 may store data/parameters/programs/codes/commands required for driving the portable device 100. Also, the memory unit 130 may store input/output data/information, and the like. The power supply unit 140*a* may supply power to the portable device 100 and may include a wired/wireless charging circuit, a battery, and the like. The interface unit 140*b* may support connection between the portable device 100 and other external devices. The interface unit 140*b* may include various ports (e.g., audio input/output ports, video input/output ports) for connection with external devices. The I/O unit 140*c* may receive or output image information/signal, audio information/signal, data, and/or information input from a user. The I/O unit 140*c* may include a camera, a microphone, a user input unit, a display 140*d*, a speaker, and/or a haptic module.

For example, in the case of data communication, the I/O unit 140*c* acquires information/signals (e.g., touch, text, voice, image, video) input from the user, and the acquired information/signal may be stored in the memory unit 130. The communication unit 110 may convert the information/signal stored in the memory into a wireless signal and transmit the converted wireless signal directly to another wireless device or to a base station. In addition, after receiving a wireless signal from another wireless device or a base station, the communication unit 110 may restore the received wireless signal to the original information/signal. After the restored information/signal is stored in the memory unit 130, the restored information/signal may be output in various forms (e.g., text, voice, image, video, haptic) through the I/O unit 140*c*.

Figure 27:
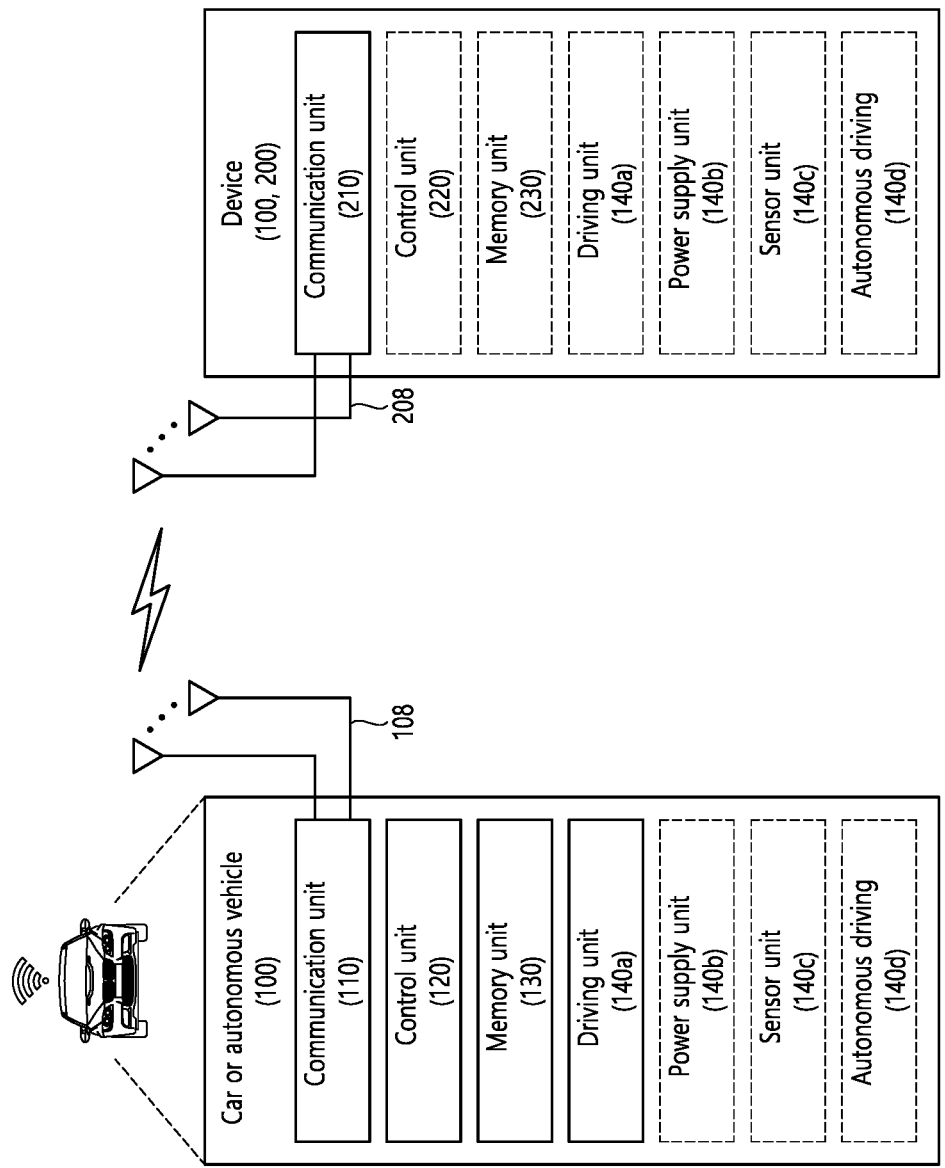
FIG. 27 illustrates a vehicle or an autonomous vehicle to which the present disclosure is applied.

FIG. 27 illustrates a vehicle or an autonomous vehicle to which the present disclosure is applied. The vehicle or autonomous vehicle may be implemented as a mobile robot, a vehicle, a train, an aerial vehicle (AV), or a ship.

Referring to FIG. 27, a vehicle or an autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. Blocks 110/130/140*a* to 140*d* correspond to blocks 110/130/140 of FIG. 25, respectively.

The communication unit 110 may transmit and receive signals (e.g., data, control signals, etc.) with external devices such as other vehicles, base stations (e.g. base stations, roadside base stations, etc.), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to travel on the ground. The driving unit 140*a* may include an engine, a motor, a power train, a wheel, a brake, a steering device, and the like. The power supply unit 140*b* supplies power to the vehicle or the autonomous vehicle 100 and may include a wired/wireless charging circuit, a battery, and the like. The sensor unit 140*c* may obtain a vehicle status, surrounding environment information, user information, and the like. The sensor unit 140*c* may include an inertial measurement unit (IMU) sensor, a collision sensor, a wheel sensor, a speed sensor, an inclination sensor, a weight detection sensor, a heading sensor, a position module, a vehicle advancement/reverse sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement a technology that maintains a driving lane, a technology that automatically adjusts a speed such as adaptive cruise control, a technology that automatically drives along a predetermined route, and a technology that automatically sets a route and drives along the route when a destination is set.

For example, the communication unit 110 may receive map data, traffic information data, and the like from an external server. The autonomous driving unit 140*d* may generate an autonomous driving route and a driving plan based on the acquired data. The control unit 120 may control the driving unit 140*a* so that the vehicle or the autonomous driving vehicle 100 moves along the autonomous driving route according to the driving plan (e.g., speed/direction adjustment). During autonomous driving, the communication unit 110 may aperiodically/periodically acquire the latest traffic information data from the external server and may acquire surrounding traffic information data from nearby vehicles. In addition, during autonomous driving, the sensor unit 140*c* may acquire a vehicle state and surrounding environment information. The autonomous driving unit 140*d* may update the autonomous driving route and the driving plan based on newly acquired data/information. The communication unit 110 may transmit information on a vehicle location, the autonomous driving route, and the driving plan to the external server. The external server may predict traffic information data in advance using an AI technology or the like based on information collected from the vehicle or autonomous vehicle and may provide the predicted traffic information data to the vehicle or autonomous vehicle.

Figure 28:
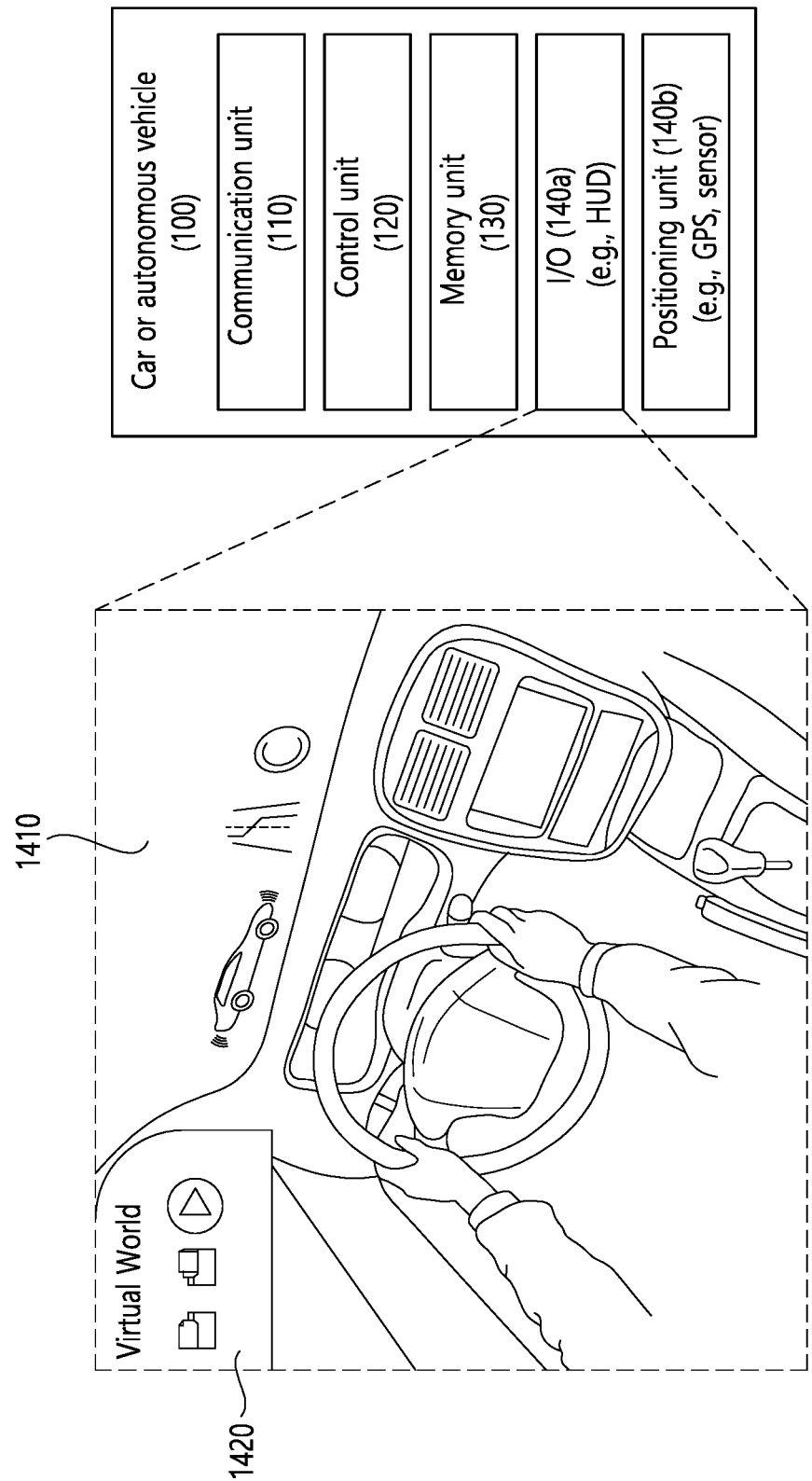
FIG. 28 illustrates a vehicle applied to the present disclosure.

FIG. 28 illustrates a vehicle applied to the present disclosure. The vehicle may also be implemented as means of transportation, trains, aircraft, and ships.

Referring to FIG. 28, the vehicle 100 may include a communication unit 110, a control unit 120, a memory unit 130, an I/O unit 140*a*, and a positioning unit 140*b*. Here, blocks 110 to 130/140*a* to 140*b* correspond to blocks 110 to 130/140 of FIG. 25, respectively.

The communication unit 110 may transmit and receive signals (e.g., data, control signals, etc.) with other vehicles or external devices such as a base station. The control unit 120 may perform various operations by controlling components of the vehicle 100. The memory unit 130 may store data/parameters/programs/codes/commands supporting various functions of the vehicle 100. The I/O unit 140*a* may output an AR/VR object based on information in the memory unit 130. The I/O unit 140*a* may include an HUD. The positioning unit 140*b* may acquire location information of the vehicle 100. The location information may include absolute location information of the vehicle 100, location information within a driving line, acceleration information, location information with nearby vehicles, and the like. The positioning unit 140*b* may include GPS and various sensors.

As an example, the communication unit 110 of the vehicle 100 may receive map information, traffic information, etc. from the external server and store the same in the memory unit 130. The positioning unit 140*b* may acquire vehicle location information through GPS and various sensors and store the vehicle location information in the memory unit 130. The control unit 120 may generate a virtual object based on map information, traffic information, vehicle location information, and the like, and the I/O unit 140*a* may display the generated virtual object on a window of the vehicle (1410, 1420). In addition, the control unit 120 may determine whether the vehicle 100 is operating normally within a driving line based on the vehicle location information. When the vehicle 100 deviates from the driving line abnormally, the control unit 120 may display a warning on a windshield of the vehicle through the I/O unit 140*a*. In addition, the control unit 120 may broadcast a warning message regarding a driving abnormality to nearby vehicles through the communication unit 110. Depending on the situation, the control unit 120 may transmit location information of the vehicle and information on driving/vehicle abnormalities to a related organization through the communication unit 110.

Figure 29:
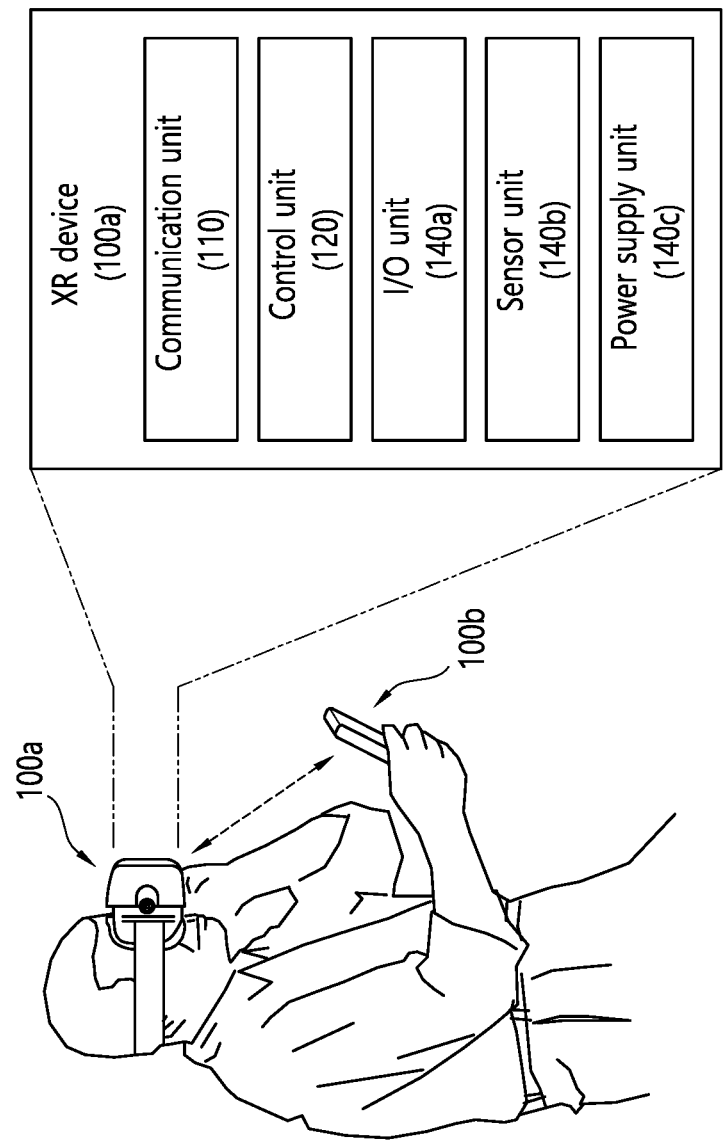
FIG. 29 illustrates an XR device applied to the present disclosure.

FIG. 29 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 29, the XR device 100*a* may include a communication unit 110, a control unit 120, a memory unit 130, an I/O unit 140*a*, a sensor unit 140*b*, and a power supply unit 140*c*. Here, blocks 110 to 130/140*a* to 140*c* correspond to blocks 110 to 130/140 of FIG. 25, respectively.

The communication unit 110 may transmit and receive signals (e.g., media data, control signals, etc.) with other wireless devices, portable devices, or external devices such as a media server. The media data may include video, images, and sound. The control unit 120 may perform various operations by controlling components of the XR device 100*a*. For example, the control unit 120 may be configured to control and/or perform procedures such as video/image acquisition, (video/image) encoding, and metadata generating and processing. The memory unit 130 may store data/parameters/programs/codes/commands required for driving the XR device 100*a*/generating an XR object. The I/O unit 140*a* may acquire control information, data, etc. from the outside and may output the generated XR object. The I/O unit 140*a* may include a camera, a microphone, a user input unit, a display unit, a speaker, and/or a haptic module. The sensor unit 140*b* may obtain an XR device status, surrounding environment information, user information, and the like. The sensor unit 140*b* may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140*c* supplies power to the XR device 100*a* and may include a wired/wireless charging circuit, a battery, and the like.

As an example, the memory unit 130 of the XR device 100*a* may include information (e.g., data, etc.) necessary for generating an XR object (e.g., AR/VR/MR object). The I/O unit 140*a* may acquire a command to operate the XR device 100*a* from the user, and the control unit 120 may drive the XR device 100*a* according to the user's driving command. For example, when the user tries to watch a movie, news, etc. through the XR device 100*a*, the control unit 120 may transmit content request information to another device (for example, the portable device 100*b*) or a media server through the communication unit 130. The communication unit 130 may download/stream content such as movies and news from another device (e.g., the portable device 100*b*) or a media server to the memory unit 130. The control unit 120 may control and/or perform procedures such as video/image acquisition, (video/image) encoding, and metadata generating/processing for the content and generate/output an XR object based on information on a surrounding space or a real object acquired through the I/O unit 140*a*/sensor unit 140*b*.

In addition, the XR device 100*a* may be wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may acquire 3D location information of the portable device 100*b* and then generate and output an XR object corresponding to the portable device 100*b*.

Figure 30:
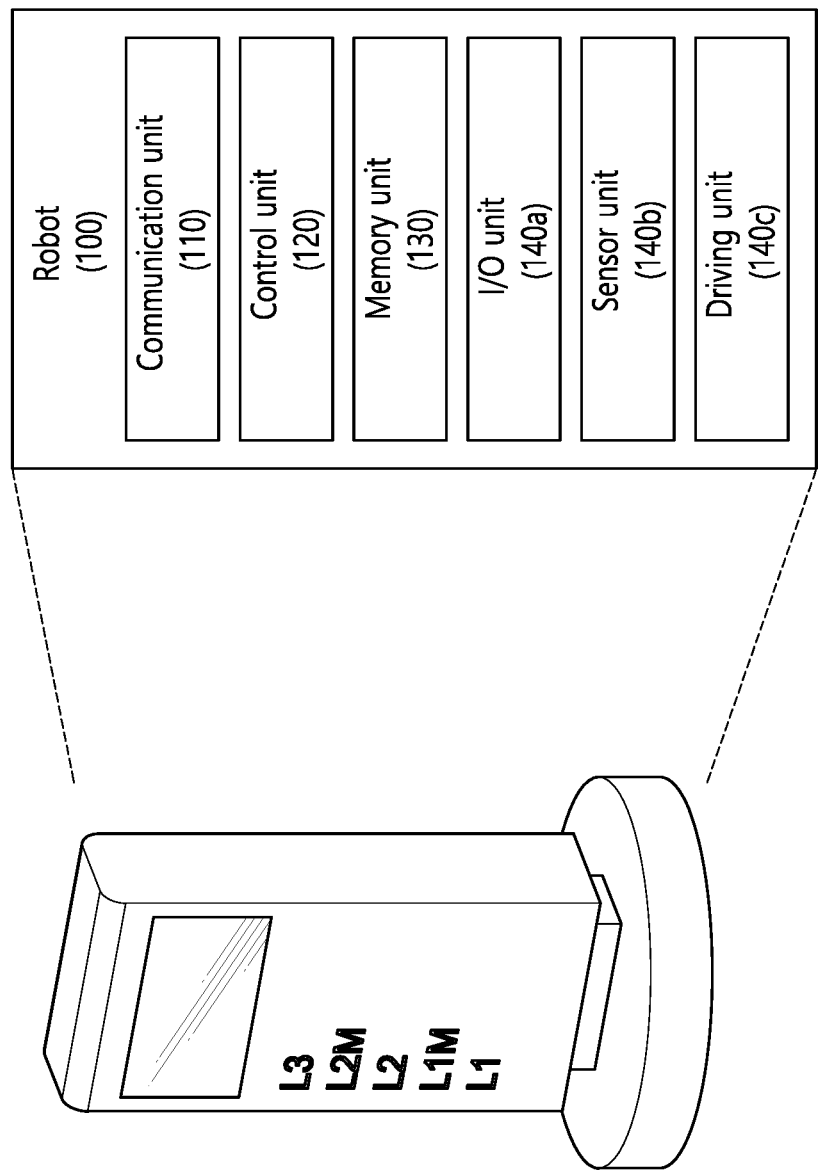
FIG. 30 illustrates a robot applied to the present disclosure.

FIG. 30 illustrates a robot applied to the present disclosure. Robots may be classified into industrial, medical, household, and military robots depending on the purpose or field of use.

Referring to FIG. 30, the robot 100 may include a communication unit 110, a control unit 120, a memory unit 130, an I/O unit 140*a*, a sensor unit 140*b*, and a driving unit 140*c*. Here, blocks 110 to 130/140*a* to 140*c* correspond to blocks 110 to 130/140 of FIG. 25, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The I/O unit 140*a* may acquire information from the outside of the robot 100 and may output information to the outside of the robot 100. The I/O unit 140*a* may include a camera, a microphone, a user input unit, a display unit, a speaker, and/or a haptic module. The sensor unit 140*b* may obtain internal information, surrounding environment information, user information, and the like of the robot 100. The sensor unit 140*b* may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may cause the robot 100 to travel on the ground or fly in the air. The driving unit 140*c* may include an actuator, a motor, a wheel, a brake, a propeller, and the like.

Figure 31:
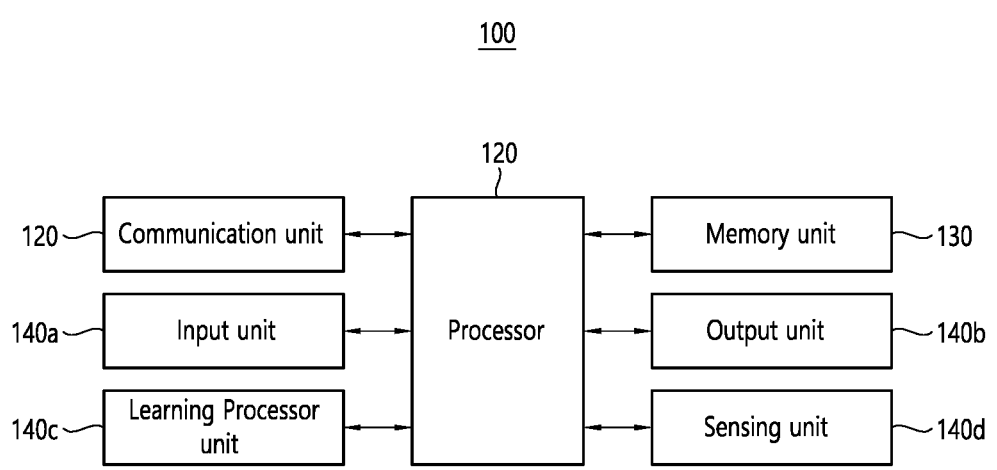
FIG. 31 illustrates an AI device applied to the present disclosure.

FIG. 31 illustrates an AI device applied to the present disclosure. AI devices may be implemented as fixed devices or mobile devices such as TVs, projectors, smartphones, PCs, notebooks, digital broadcasting terminals, tablet PCs, wearable devices, set-top boxes (STBs), radios, washing machines, refrigerators, digital signage, robots, vehicles, etc.

Referring to FIG. 31, the AI device 100 includes a communication unit 110, a control unit 120, a memory unit 130, input/output units 140*a* and 140*b*, a learning processor unit 140*c*, and a sensor unit 140*d*. Blocks 110 to 130/140*a* to 140*d* correspond to blocks 110 to 130/140 of FIG. 25, respectively.

The communication unit 110 may transmit or receive wired/wireless signals (e.g., sensor information, user inputs, learning models, control signals, etc.) with external devices such as other AI devices (e.g., FIG. 21, 100*x*, 200, 400) or external devices such as the AI server 200. To this end, the communication unit 110 may transmit information in the memory unit 130 to an external device or may transmit a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data of the learning processor unit 140c or the memory unit 130 and control components of the AI device 100 to execute a predicted operation or an operation determined to be desirable among at least one executable operation. In addition, the control unit 120 may collect history information including the user's feedback on the operation content or the operation of the AI device 100 and stores the collected history information in the memory unit 130 or the learning processor unit 140c or transmit the history information to the external device such as the AI server (400 of FIG. 22). The collected history information may be used to update a learning model.

The memory unit 130 may store data supporting various functions of the AI device 100. For example, the memory unit 130 may store data obtained from the input unit 140a, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 120 may acquire learning data for model learning and input data to which the learning model is to be applied. The input unit 140a may include a camera, a microphone, and/or a user input unit. The output unit 140b may generate output related to visual, auditory, or tactile sensation. The output unit 140b may include a display unit, a speaker, and/or a haptic module. The sensing unit 140 may obtain at least one of internal information of the AI device 100, surrounding environment information of the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model composed of an artificial neural network using the learning data. The learning processor unit 140c may perform AI processing together with the learning processor unit of the AI server (400 of FIG. 22). The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

Finally, the claims set forth herein may be combined in a variety of manners. For example, the technical features of the method claims herein may be combined with each other so to be implemented as an apparatus. The technical features of the apparatus claims herein may be combined with each other so as to be implemented as a method. Further, the technical features of the method claims herein and the technical features of the apparatus claims herein may be combined with each other so as to be implemented as an apparatus. Further, the technical features of the method claims herein and the technical features of the apparatus claims herein may be combined with each other so as to be implemented as a method.

What is claimed is:

1. A method for performing a transmission of a physical sidelink control channel (PSCCH) in a wireless communication system, the method performed by a user equipment (UE) and comprising:

performing the transmission of the PSCCH,
wherein the PSCCH indicates resource and information used by the UE for a physical sidelink shared channel (PSSCH); and
performing a transmission of the PSSCH,
wherein at least one of a first mode and a second mode is supported for the UE,
wherein, in the first mode, a sidelink resource allocation is provided,
wherein, in the second mode, the UE decides at least one sidelink transmission resource in a resource pool,
wherein the UE supporting bundled transmission time intervals (TTIs) performs the transmission of the PSSCH via the bundled TTIs, and
wherein, based on a change in power in the bundled TTIs occurring, the UE transmits the PSCCH which includes power-related information.

2. The method of claim 1, wherein the UE repeatedly transmits the PSSCH in each of the bundled TTIs.

3. The method of claim 1, wherein the UE transmits the PSCCH each time in each of the bundled TTIs or per a predefined TTI length unit within the bundled TTIs.

4. The method of claim 1, wherein the power-related information includes information about a period for which the power is constantly maintained within the plurality of bundled TTIs.

5. The method of claim 1, wherein the power-related information includes information about a period for which the power changes within the plurality of bundled TTIs.

6. The method of claim 1, wherein the UE supports simultaneous transmission on a first carrier and a second carrier,
wherein when the UE performs a transmission operation on the second carrier while performing a transmission operation on the first carrier, the UE determines that the change in the power in the bundled TTIs occurs.

7. The method of claim 1, wherein the information related to the change is feedback notification information,
wherein when feedback transmission occurs in the bundled TTIs, the UE includes the feedback notification information into the PSCCH and then transmits the PSCCH.

8. The method of claim 7, wherein the feedback notification information includes information about an index of a TTI to which feedback is mapped among the bundled TTIs.

9. The method of claim 7, wherein the feedback notification information includes information indicating that feedback is transmitted in a corresponding TTI.

10. A user equipment (UE) comprising:
a transceiver for transmitting and receiving a radio signal; and
a processor configured to control the transceiver,
wherein the processor is configured to:
perform a transmission of a physical sidelink control channel (PSCCH),
wherein the PSCCH indicates resource and information used by the UE for a physical sidelink shared channel (PSSCH); and
perform a transmission of the PSSCH,
wherein at least one of a first mode and a second mode is supported for the UE,
wherein, in the first mode, a sidelink resource allocation is provided,
wherein, in the second mode, the UE decides at least one sidelink transmission resource in a resource pool, wherein the UE supporting bundled transmission time intervals (TTIs) performs the transmission of the PSSCH via the bundled TTIs, and wherein, based on a change in power in the bundled TTIs occurring, the UE transmits the PSCCH which includes power-related information.

* * * * *